United States Patent
Allen et al.

(10) Patent No.: US 9,188,355 B1
(45) Date of Patent: Nov. 17, 2015

(54) FAN ARRAY CONTROL SYSTEM

(75) Inventors: Don Allen, Portland, OR (US); Jay Kamani, Beaverton, OR (US); Phuong Le, Sherwood, OR (US); Jack Cornelius, Lake Oswego, OR (US)

(73) Assignee: Digital Control Systems, Inc., Portland, OR (US)

(*) Notice: Subject to any disclaimer, the term of this patent is extended or adjusted under 35 U.S.C. 154(b) by 364 days.

(21) Appl. No.: 13/342,902

(22) Filed: Jan. 3, 2012

(51) Int. Cl.
*F24F 11/00* (2006.01)

(52) U.S. Cl.
CPC ..... *F24F 11/0001* (2013.01); *F24F 2011/0063* (2013.01)

(58) Field of Classification Search
CPC .......... F04D 19/002; F24F 7/00; F24F 11/00; F24F 11/0001; F24F 2011/0063
USPC .......... 454/228, 229, 230, 233; 417/3, 423.5, 417/426; 415/1, 61, 119, 338; 416/120
See application file for complete search history.

(56) References Cited

U.S. PATENT DOCUMENTS

| | | | |
|---|---|---|---|
| 5,487,073 A * | 1/1996 | Urien | 714/717 |
| 6,135,718 A | 10/2000 | Yang | |
| 6,400,045 B1 | 6/2002 | Hosokawa et al. | |
| 6,650,074 B1 | 11/2003 | Vyssotski et al. | |
| 6,824,362 B2 | 11/2004 | Dodson, III | |
| 6,826,456 B1 | 11/2004 | Irving et al. | |
| 6,881,142 B1 * | 4/2005 | Nair | 454/186 |
| 7,137,775 B2 | 11/2006 | Hopkins | |
| 7,142,125 B2 | 11/2006 | Larson et al. | |
| 7,596,727 B2 | 9/2009 | Kuo | |
| 7,623,028 B2 | 11/2009 | Kates | |
| 7,633,250 B2 * | 12/2009 | Sato | 318/268 |
| 7,904,734 B1 | 3/2011 | Singla et al. | |
| 2006/0149422 A1 | 7/2006 | Dunstan et al. | |
| 2006/0176186 A1 | 8/2006 | Larson et al. | |
| 2007/0081888 A1 | 4/2007 | Harrison | |
| 2008/0270162 A1 * | 10/2008 | Machacek | 705/1 |
| 2009/0123284 A1 | 5/2009 | Madsen | |

(Continued)

FOREIGN PATENT DOCUMENTS

WO 0036275 A1 6/2000

OTHER PUBLICATIONS

Atmox, Atmox Attic 150 System, Web Page: http://atmox.com/AtticSystems/ATTIC150System/tabid/148/Default.aspx, Copyright Date 2007-2011, (1 page), Atmox, World Wide Web Internet.

*Primary Examiner* — Gregory Huson
*Assistant Examiner* — Dana Tighe
(74) *Attorney, Agent, or Firm* — Howard Russell

(57) ABSTRACT

A system and method for intelligent management of an array of fans. The system uses mean-time-between-failure, fan usage and other data in add ventilation, subtract ventilation and recycle array routines to maximize the life of the fans and the array. The system comprises a primary embodiment making use of smart fans in the array, each smart fan including a fan and appropriate control electronics capable of processing commands received from a smart fan array controller. Fan control signals are multiplexed over a local operating network power line using carrier communication protocols, command messages and data values, all to accomplish a goal of the system to maximize fan life. In an alternate embodiment, fan and array control electronics are integrated onto the fan array controller itself and power is provided to conventional fans using a conventional wiring harness.

24 Claims, 17 Drawing Sheets

FIG. 1

(56) References Cited

U.S. PATENT DOCUMENTS

| | | | |
|---|---|---|---|
| 2009/0307512 A1* | 12/2009 | Munjal et al. | 713/324 |
| 2009/0308579 A1* | 12/2009 | Johnson et al. | 165/104.34 |
| 2011/0014046 A1 | 1/2011 | Gallet | |
| 2011/0320043 A1* | 12/2011 | Mikuszewski et al. | 700/275 |

* cited by examiner

FAN MONITORING (DYNAMIC VALUES)

| Name | Memory model in bits |
|---|---|
| DEV_ID | ▯▯▯▯▯▯▯▯ |
| LIFE | ▯▯▯▯▯▯▯▯▯▯▯▯▯▯▯▯▯▯▯▯▯▯▯▯ |
| HOURS_USED | ▯▯▯▯▯▯▯▯▯▯▯▯▯▯▯▯▯▯▯▯▯▯▯▯ |
| MOTOR | ▯▯▯▯▯▯▯▯ |
| STATUS | ▯▯▯▯▯▯▯▯ |
| SPEED | ▯▯▯▯▯▯▯▯ |
| START_TIME | ▯▯▯▯▯▯▯▯▯▯▯▯▯▯▯▯▯▯▯▯▯▯▯▯ |
| AIR_FLOW | ▯▯▯▯▯▯▯▯▯▯▯▯▯▯▯▯ |
| CURRENT | ▯▯▯▯▯▯▯▯▯▯▯▯▯▯▯▯ |
| TEMPERATURE | ▯▯▯▯▯▯▯▯▯▯▯▯▯▯▯▯ |
| USE_CYCLES | ▯▯▯▯▯▯▯▯▯▯▯▯▯▯▯▯ |

*FIG. 7*

PROTOCOL ELEMENT REFERENCE KEY

| Protocol Description | Protocol Symbol |
|---|---|
| Attention | ATN |
| Poll request | POL |
| Read static data block | RSD |
| Read dynamic data block | RDD |
| Device on | DON |
| Device off | DOF |
| All on | AON |
| All off | AOF |
| Device attention | DAT |
| Success | SUS |
| Failure | FAL |
| Write dynamic data block | WDD |
| Speed | SPE |
| Checksum | CHK |
| End | END |
| Device number | DEV |
| Static Data Block | SDB |
| Dynamic Data Block | DDB |

*FIG. 13*

| System Message Block Description | Protocol Symbols |
|---|---|
| Poll Devices Protocol | |
|     Request poll devices | ATN \| POL \| END |
|     Device reply | DAT \| DEV \| END |
| Read Static Data Block Protocol | |
|     Read Static Data Request | ATN \| DEV \| RSD \| END |
|     Device reply | DAT \| DEV \| SDB \| CHK \| END |
| Read Dynamic Data Block Protocol | |
|     Read Dynamic Data Request | ATN \| DEV \| RDD \| END |
|     Device reply | DAT \| DEV \| DDB \| CHK \| END |
| Write Dynamic Data Block Protocol | |
|     Read Dynamic Data Request | ATN \| DEV \| WDD \| DDB \| CHK \| END |
|     Device reply with success | DAT \| DEV \| SUS \| END |
|     Device reply with failure | DAT \| DEV \| FAL \| END |

*FIG. 14*

| System Message Block Description | Protocol Symbols |
|---|---|
| All Devices OFF Protocol | ATN \| AOF \| END |
| All Devices ON Protocol | ATN \| AON \| END |
| Device OFF Protocol | |
|    Device OFF Protocol | ATN \| DEV \| DOF \| END |
|    Device OFF Success Response | DAT \| DEV \| DOF \| SUS \| END |
|    Device OFF Failure Response | DAT \| DEV \| DOF \| FAL \| END |
| Device ON Protocol | |
|    Device ON Protocol | ATN \| DEV \| DOF \| END |
|    Device ON Success Response | DAT \| DEV \| DON \| SUS \| END |
|    Device ON Failure Response | DAT \| DEV \| DON \| FAL \| END |

FIG. 15

FAN ARRAY CONTROL SYSTEM

FIELD OF INVENTION

The invention relates generally to fans and fan arrays, and more specifically to fans and fan arrays having control systems that enable automated operation of one or more fans in the array in a way that conserves energy and increases the anticipated lifetime of the array over prior art fan arrays.

BACKGROUND

Mean-Time-Between-Failure (MTBF) and Duty Cycle for Fans

Fans, or blowers, are used to move air in a desired direction. Such fans can be used in a variety of applications, including but not limited to ventilating and cooling an area such as attic space, protecting components from overheating such as in a desktop, or larger, computer housing, evacuating humid or moist air such as in a bathroom after a shower, or evacuating hazardous gases or smoke from an area in a fire protection or other environmental control system.

Such fans are rated by a manufacturer specification of mean-time-between-failure (MTBF) designating the number of hours that the fan, on average, will run before it risks end of life types of failure. Thus, the MTBF of a particular type of fan is referred to as a predicted elapsed time between failures of the fan during operation, and it is calculated by the manufacturer as the arithmetic mean (average) time between failures for that type of fan.

MTBF is often expressed in connection with a duty cycle requirement for a fan. Duty cycle for a fan is defined as the ratio of the on-time fan operating duration to a total period (both on and off combined). Thus, a fan may be rated by its manufacturer with a particular MTBF assuming a duty cycle of no more than 75% on and 25% off for each hundred-hour period of fan life. If a particular system design requires fan usage in excess of the specified duty cycle for the fan, full useful life of the fan would not be achieved on average.

After a fan has run for the rated time according to its MTBF, failure may be anticipated and the fan may be replaced prior to failure during scheduled maintenance of the system. Thus, an understanding and application of MTBF, duty cycle and system maintenance are important since critical failure of a fan may lead to a variety of failures including but not limited to overheating damage, mold and mildew damage, and enhanced damage or injury from hazardous gases and smoke, depending upon the purpose for which the fan or fans have been deployed.

The replacement and repair of individual fans may in some cases be inconvenient, and especially so where the fans are not readily accessible, such as on a highly pitched rooftop or inside of a computer system that must be turned off in order to access the fans. One means of addressing the cost and inconvenience of fan failures has been to purchase higher-quality, typically more expensive, fans in order to increase MTBF. A downside to this approach is the higher up-front expense of installing and replacing such a system.

Fan Arrays

Another means of addressing the inconvenience and cost of replacing and repairing individual fans, as well as providing a higher-efficiency system for meeting system demands, has involved the development of redundant fan systems, or an array of fans, used in an effort to provide a longer-life system. Consideration of MTBF and duty cycle ideally applies to fan arrays, as well as single fans, and these concepts are an important part of scheduling repair, renewal and maintenance of fan arrays. However, prior art fan array systems have paid little or no heed to MTBF and duty cycle considerations in fan arrays.

Fully Redundant Fan Arrays

An array of fans may be fully redundant, partially redundant or not redundant at all. In a fully redundant system using switched identical fans, the overall MTBF of the system is increased by a multiple of the amount of redundancy employed. In the simplest of such systems using a plurality of identical fans, a first fan would simply run, or be available, until it fails, and then successive fans would be employed, and so on in a series-switched system, until the last fan in the system has been used up. In such a case, the overall MTBF of the array would have been the product of the number of fans and the MTBF of an individual fan: system MTBF=n×MTBF, where n=the number of fans. Where multiple types of fans with different MTBF characteristics have been employed in a single such system, the system MTBF would have been expressed as a sum of the MTBF for each fan in the array. Cost savings in a fully redundant fan array has been primarily associated with enhanced avoidance of failure associated damages and any economies of scale of volume purchasing, volume installations and volume repairs. More importantly, increase of lifespan of such fully redundant switched arrays beyond that normally expected by increasing the redundancy of fans in the array, has not occurred with and has not been a stated goal of such prior art fan arrays.

A suitable example of a fully redundant array system would comprise three identical fans, where one fan alone has provided sufficient capacity to meet demand, and two of the fans have been considered as backup fans. Absent volume purchasing and installation cost savings, such a system would have cost three times as much in terms of fan costs and installation as a single fan system, and the life of the array may have been expected to have lasted approximately three times as long as a single fan. Thus, though using such an array has been more convenient than a single fan from a maintenance and repair perspective, there has been no appreciable additional cost savings or enhancement of the life of the array beyond the sum of the MTBFs of each fan in the array.

The foregoing arrays are representative of fully redundant arrays, and the same basic MTBF and duty cycle considerations would hold true regardless of whether a single fan is used at a time or multiple fans are used at capacity at a time, assuming complete redundancy. Thus, for example, where two full duty cycle fans at capacity are needed to meet demands, and serial switching is employed, 3× redundancy would assume a system with six fans, and so on, and the same limitations on cost savings and enhanced system MTBF would apply.

Non-Redundant Fan Arrays

Non-redundant fan arrays involve a system where all fans in the array are used essentially at or near maximum duty cycle. While in such a case greater performance effectiveness and perhaps efficiencies have been accomplished by implementing an array, such a prior art array has not been employed so as to have enhanced the overall MTBF of the system beyond the rated MTBF of one of the fans of the system.

Partially Redundant Fan Arrays

Partially redundant arrays of fans have typically involved the use of control systems for determining the number of fans to be used in parallel, depending upon need, to meet requirements. Partially redundant arrays of fans have been developed primarily for HVAC systems where variable demands for cooling and ventilation have been required by an external device such as a thermostat, an emergency fire or hazardous air abatement and control system, a remote control device or a user-operated or automated switch. Accordingly, such systems have involved simultaneous use of multiple fans in a parallel array to meet varying system demands, for example for use during higher-temperature or higher-humidity periods.

Thus, for example, a partially redundant array of fans has comprised three fans that are all available in parallel to maintain thermostat readings in a cooling system at below a predetermined maximum. As the object of the cooling system, for example a building or a main frame computer system, has generated more heat than is able to be cooled with a single fan, additional fan power has been automatically added with control means responsive to data received from the thermostat. Further, such partially redundant fan arrays have incorporated application of remaining fan power upon encountering a failed fan in the system, similar to the serially-switched, completely redundant systems described above.

An example of such a system is found in U.S. Pat. No. 6,826,456 to Irving, et al., for System and Method For Controlling Server Chassis Cooling Fans, which teaches temperature sensing for controlling prior art fans that has included either an on-board, or an external, temperature sensor that has controlled the turning on and running of fans based upon increased temperature readings from the temperature sensor.

In conjunction with prior art fan array systems, whether they be fully redundant, partially redundant, or not redundant, there have been developed minimal signaling and reporting capability by failed fans. For example a system has been described in US Patent Application Serial No. 2006/0176186 to Larson et al., for Fan Monitoring for Failure Prediction, that has automatically notified an information technology professional when a fan of a fan array in a computer system is predicted to fail. This has allowed the IT professional to replace the fan or fan array, for example in a hot swappable fan system wherein the overall computer system has continued to operate while the fan, or fan array, has been removed and replaced.

Also, as demonstrated by U.S. Pat. No. 6,824,362 to Dodson III, for Fan Control System, other prior art fan array systems have employed an on-board tachometer that has been capable of actuating an alarm for under-speed fan conditions, thus signaling a potential critical fan failure or needed repair.

As may be appreciated from the foregoing description, partially redundant systems have presented a more complicated scenario for considering system MTBF and duty cycle, since each such partially redundant fan array system has presented widely diverging and unique capabilities to meet widely varying demands.

While there have been developed simple fan array controllers for determining the number of fans deployed responsive to an external device, such as a thermostat or a fire control system, and while there have been deployed fan array systems incorporating minimal fan data transfer and consideration by such a controller to accomplish simple management tasks, such as replacing a hot-swappable fan, a system for enhancing fan array life based upon static and dynamic fan data received from fans in the array has not been found in the prior art.

Thus, there has been lacking in the prior art a fan array system that has the intelligence for making determinations about which fans to use based upon demand, static fan data, such as rated MTBF, duty cycle and rated power consumption, rated temperature and rated speed, and dynamic fan data, such as hours in use, actual power consumption, revolutions per minute, and calculated remaining life, to enhance the MTBF of a fan system. Further, prior art systems have not allowed for inclusion of fans having differing MTBFs or other characteristics in a single array in a way that determines use based upon fan capability in order to enhance overall MTBF.

SUMMARY OF THE INVENTION

In accordance with a first aspect of the invention, a ventilation fan system is provided that is adapted for responding to an external device making requests for required changes in ventilation and in accordance with enhancement of mean-time-between-failure of the system. The system comprises: a plurality of ventilation fans and a fan array controller operatively interconnected by a network to the plurality of ventilation fans. The fan array controller is adapted for sending and receiving signals to and from each of the ventilation fans over the network, and the fan array controller is further adapted for receiving requests and sending status to and from the external device. The system further comprises means for communicating between the plurality of ventilation fans and the fan array controller, wherein each of the ventilation fans is adapted for selectively responding to control and data requests received from the fan array controller, and wherein the fan array controller deploys the plurality of ventilation fans in accordance with data received from the plurality of ventilation fans and the external device to lengthen the useful life of the ventilation fan system.

In accordance with another embodiment of the invention, there is provided an extended-life ventilation fan system adapted for providing ventilation to a target environment. The ventilation fan system of this embodiment comprises: a ventilation control device, a plurality of ventilation fans and a fan array controller operatively interconnected to the plurality of ventilation fans and the ventilation control device. The fan array controller is adapted for turning on and off each of the ventilation fans in accordance with commands received from the ventilation control device and in accordance with static data and dynamic data for each fan so as to increase fan life of the system. The ventilation fan system further comprises: means for the fan array controller to communicate power on and off signals to the ventilation fans. Thus, in accordance with this embodiment of the invention, each fan may comprise a fan motor and a computer readable input/output port means operatively connected to the fan motor for toggling the fan motor on and off responsive to control requests received from the fan array controller.

Preferably, after a pre-determined period of time, the ventilation fan system in accordance with either embodiment of the invention reconfigures fan deployment to meet ventilation demands, and to lengthen the useful life of the ventilation fan system. Further, preferably, after the receipt of new data by the fan array controller from at least one of the plurality of ventilation fans in accordance with the first embodiment of the invention, the ventilation fan system reconfigures fan deployment to meet ventilation demands and lengthen the useful life of the ventilation fan system. In the second embodiment of the invention, such reconfiguration would be accomplished after the receipt of new data by the fan array controller from independent sensors reporting to the fan array controller, or based upon system clock data and/or logic from onboard the controller. In either embodiment of the invention, this periodic reconfiguration of the fan array is preferably accomplished by a recycle array routine which removes from deployment one or more ventilation fans that are approaching their maximum on time, places the removed fan, or fans, in a resting state, and replaces them with an inactive fan, or fans, having the longest lifetime available.

Thus, in accordance with this first aspect of the invention there is provided, in one embodiment, a ventilation fan system comprising smart fans that enhances the lifetime of the system by deploying the smart fans in accordance with fan data received from the fans, and in another embodiment, a ventilation system comprising conventional fans that enhances the lifetime of the system by deploying the fans in accordance with data maintained onboard the fan array controller.

In accordance with another aspect of the invention, the plurality of ventilation fans and the fan array controller, per the first embodiment of the first aspect of the invention described previously, are operatively connected and communicate over a single parallel power supply bus. This aspect of the invention provides easy and minimal wiring, configuration and re-configuration of the fans in the array.

In accordance with still another aspect of the invention, at least one of the ventilation fans in accordance with the first embodiment of the invention may be adapted for triggering a directed communication to the fan array controller upon the occurrence of a dynamic parameter outside of a predetermined range. Such a dynamic parameter includes at least one of fan speed out of range, fan motor consuming excess current, excess fan temperature and fan failure. Similarly, the fan array controller is preferably capable of automatically removing a failed one of the plurality of ventilation fans of the array from deployment, and replacing the failed fan with another fan based upon dynamic fan data provided to the fan array controller by the failed fan. Thus, this aspect of the invention provides for interoperability of the fan array controller with smart fans capable of initiating a change in fan use or configuration upon detection, by the fan, of an error, out of range operation, or failure condition. This in turn lends to the flexibility of designing a smart fan array system comprising life enhancing characteristics in accordance with the invention.

In accordance with yet another aspect of the invention, the fan array controller of the ventilation fan system considers ventilation fan provided data in determining deployment of a combination of fans to meet requirements with a plurality of fans having differing capabilities. Thus, wherein at least one of the plurality of fans has differing capabilities than another of the plurality of fans, the fan array controller considers ventilation fan provided data from each of the plurality of fans in determining deployment of the combination of fans to ventilate the target environment. This aspect of the invention allows for flexibility in designing fan arrays comprising fans of differing capabilities to suit different requirements, perhaps at different times, the overall system being programmable so as to more easily incorporate the fans of different capabilities into an overall, coherent, system that has extended-lifetime features for maximum uptime, availability and life. Such fan array systems as those contemplated by the present invention are not only easier to design and implement, but maintenance cost, effort and time for such a system is decreased.

In accordance with still another aspect of the invention, the ventilation fan system, regardless of the embodiment, is configured with static data further comprising manufacturer specified fan mean-time-between-failure and fan duty cycle data. In the case of the first embodiment of the invention, the system may be automatically configured with such static fan data when the fan array controller polls the smart fan. In the case of the second embodiment of the invention, the system may be manually configured by loading fan static specification data into memory onboard the controller for operating the system. Still further, in accordance with either embodiment and this aspect of the invention, the system further makes use of dynamic data comprising at least time in use data for the ventilation fans, the system further comprising means for computing remaining life of each ventilation fan and selecting for ventilation use one of the plurality of ventilation fans having the most remaining life. In the first embodiment of the invention this dynamic data may be obtained from a smart fan itself, whereas in the second embodiment of the invention, this dynamic data may be derived from processing logic and memory onboard the fan array controller. Such a system further comprises means for turning off the fan having the least remaining life of the plurality of ventilation fans in accordance with the fan's time in use data, whether that data is obtained from the fan itself or from system memory onboard and retrieved by the fan array controller. The system is then capable of using the static and dynamic fan data, received either from the plurality of ventilation fans, from sensors, or from system memory, to lengthen the useful life of the ventilation fan system by deploying least used fans having the longest remaining life.

Accordingly, the fan array controller is capable of reading the static and dynamic data stored onboard each fan in order to autoconfigure the system and to efficiently deploy the fans of the system in a manner that is responsive to requirements presented to the controller by the external control device, such as a thermostat, remote control means or a humidity sensor. The ventilation fan system of the invention thus allows energy savings, efficiently tailored deployment of fans depending upon system requirements and maximization of expected mean-time-between-failure for the overall ventilation fan system.

It will be apparent to those of ordinary skill in the art that a fan array controller, or portions of a fan array controller, may be integrated onto one or more individual fans, and this would not depart from the true spirit and scope of the invention. Such capability facilitates installation of the system and implementation to a wider variety of applications where installation of an independent controller may make system implementation more difficult. Thus, in accordance with another aspect of the invention, it will be appreciated that there may comprise varying degrees of integration on the fan array controller and each ventilation fan in the array. Thus, further and preferably, in the ventilation fan system in accordance with the first embodiment of the invention, each of the ventilation fans may comprise computer readable memory for storing static fan specification data alone, while dynamic fan data may be derived from sensors and/or system clock, logic and memory on the array controller. Such a system would be considered to have partially integrated fans and a partially integrated fan array controller. Or, alternatively, each ventilation fan may further comprise computer readable memory for storing fan specification data, wherein each fan may comprise onboard controller means for communicating with the fan array controller, and wherein each ventilation fan is adapted for responding to requests for static and dynamic data from the fan array controller. Still further, preferably, each ventilation fan may comprise computer readable memory for storing dynamic fan status data, wherein each ventilation fan is adapted for responding to requests for dynamic fan status from the fan array controller, while static data may be pre-configured or programmed onto the fan array controller. Thus, it will be apparent to those of ordinary skill in the art that the degree of integration of the features of the invention, whether on the fan array controller, the fan array CPU, or on a controller and/or memory onboard individual fans, if for enhancing the life of the array considering static and dynamic fan data, would not depart from the true scope and spirit of the invention.

Accordingly, the fan array controller is capable of reading the static and dynamic data stored on board each fan in order to automatically configure the system and to efficiently deploy the fans of the system in a manner that is responsive to requirements presented to the controller by the external control device, such as a thermostat, remote control means or a humidity sensor. The ventilation fan system of both aspects of the invention thus allow energy savings, efficiently tailored deployment of fans depending upon system requirements and maximization of expected mean-time-between-failure for the overall ventilation fan system. Further, the system may receive commands from an external ventilation control device, such as an environmental controller or thermostat, or include such a ventilation control device, that is adapted for the determination of the presence of at least one of heat from fire, smoke and hazardous gases in the target environment. In such case the fan array controller may be adapted to respond to requests determined and made by such a ventilation control device in accordance with sensor inputs to the ventilation control device. Thus, for example, the invention is readily adapted for shutting off all fans of the system when a fire is detected, or alternatively, for turning on all fans when hazardous gases are detected.

While an independent controller has been disclosed, it will be apparent to those of ordinary skill in the art that such a controller, or portions of such a controller, integrated onto one or more individual fans would not depart from the true spirit and scope of this disclosure. Such capability will facilitate installation of the system and implementation to a wider variety of applications where installation of an independent controller may make system implementation more difficult.

Energy savings, efficient tailoring of fan deployment to system requirements and particularly enhancement of mean-time-between-failure of the system is accomplished by coordinated control routines, including add ventilation, subtract ventilation and recycle array routines. These routines are deployed depending upon system requirements and input from other called routines that present fan data to the controller. These routines utilize a calculation for determining the remaining lifetime of the fans in the system that divides dynamic hours in service data by static anticipated mean-time-between-failure data to determine anticipated remaining fan life. The result is multiplied by a static value, conveniently chosen for computing as 65,535 which accommodates easy storage and comparison with calculated remaining fan life for other fans, and the value is stored in the life dynamic data value. These values are later used in determining which fan to add or which fan to subtract from service in the array.

It will be appreciated that ventilation fans having added capabilities, such as motor temperature sensing, current draw sensing, speed sensing and/or airflow sensing, may be used with the system invention without departing from the true scope and spirit of the invention. For example, such fan capabilities may be used for monitoring or reporting purposes. Further, it will be appreciated that programming of an array controller responsive to such capabilities may be devised in future fan array control systems without departing from the true scope and spirit of the invention, where such capabilities may be used to enable enhancement of fan array life.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTION OF THE DRAWINGS

FIG. 5b discloses in greater detail an exemplary fan control logic and interface unit usable by the smart fan array control system of FIG. 5a;

FIG. 7 is a table representing storage in computer readable memory of each type of dynamic fan data for each fan in the array;

FIG. 13 is a table showing an index of basic protocol elements and their definitions for a local operating network in accordance with the invention;

FIG. 14 is a table showing protocols for polling smart fans, reading static fan data blocks and reading and writing dynamic fan data blocks; and FIG. 15 is a table showing protocols for turning all fans in an array on or off, for turning on or off any specific fan in an array, and success and failure response protocols for any specific fan in the array.

DETAILED DESCRIPTION

Smart Fan Array and Array Controller Embodiment

Figure 1:
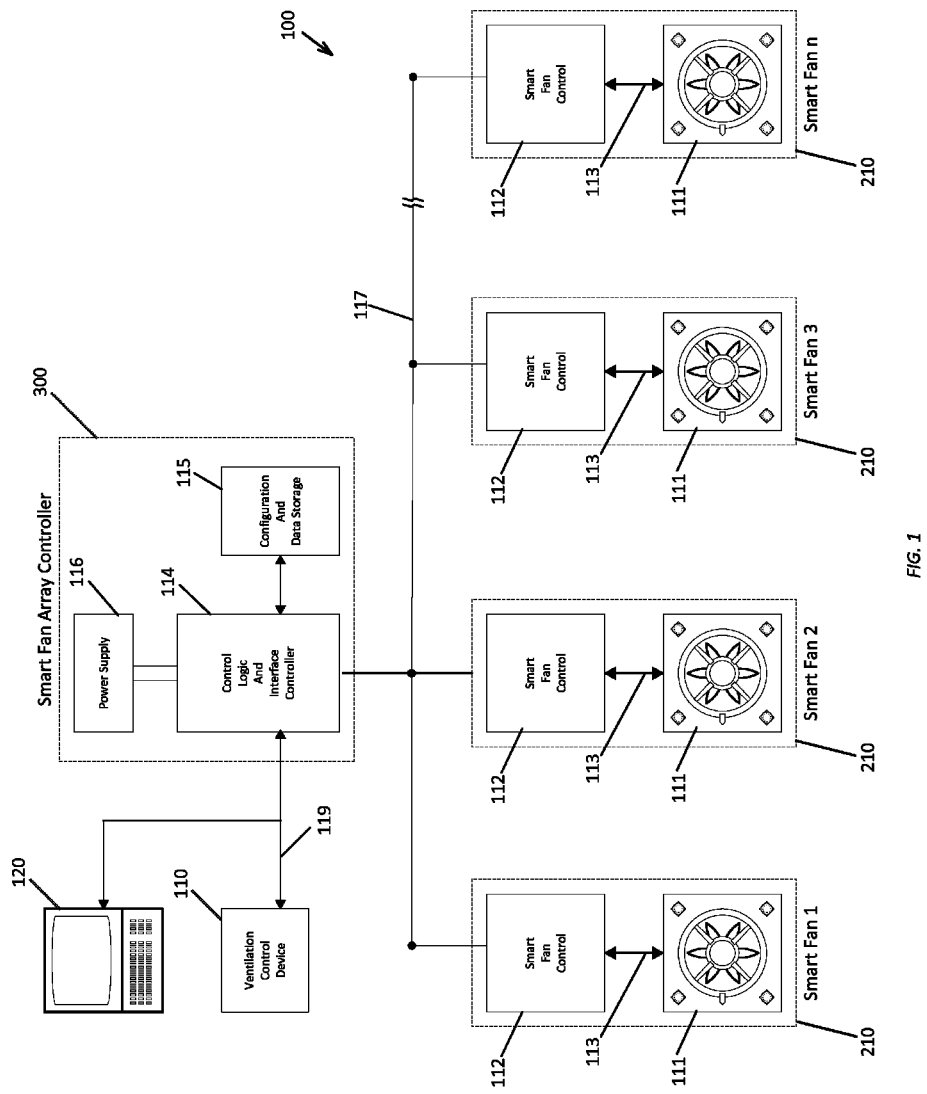
FIG. 1 is a block diagram of a smart fan array and smart fan array control system in accordance with an embodiment of a first aspect of the invention.

Referring to FIG. 1, there is shown a first embodiment of a smart fan array system comprising a smart fan array 100 connected over a local operating network 117 to a smart fan array controller 300.

Commands for controlling the smart fan array system are primarily received from an external ventilation control device 110 networked via network 119 to the controller 300. Optionally, a computer 120 also may be networked via network 119 for purposes of ventilation control, programming, configuring and initialization of the system. The external ventilation controller 110 may consist of a simple thermostat, or of a more complex processor 120, which determines and conveys ventilation requirements for a target environment, and is designed to send commands to the smart fan array controller 300 to meet such ventilation requirements. Preferably, the external ventilation controller 110 is capable of requesting the following: added ventilation, reduced ventilation, turning on of all fans in the array, or turning off all fans in the array. Of course, other commands may be implemented from an external ventilation controller 110, such as for fire control, toxic gas removal, or energy savings, without departing from the true scope and spirit of the invention. Further, it will be appreciated by those of ordinary skill in the art that network 119 could be accomplished with twisted pair or coaxial wiring, radio frequency communications (wireless), infrared, optical or power-line carrier connection without departing from the true scope and spirit of the invention.

Smart Fan Array Controller Hardware

Figure 3:
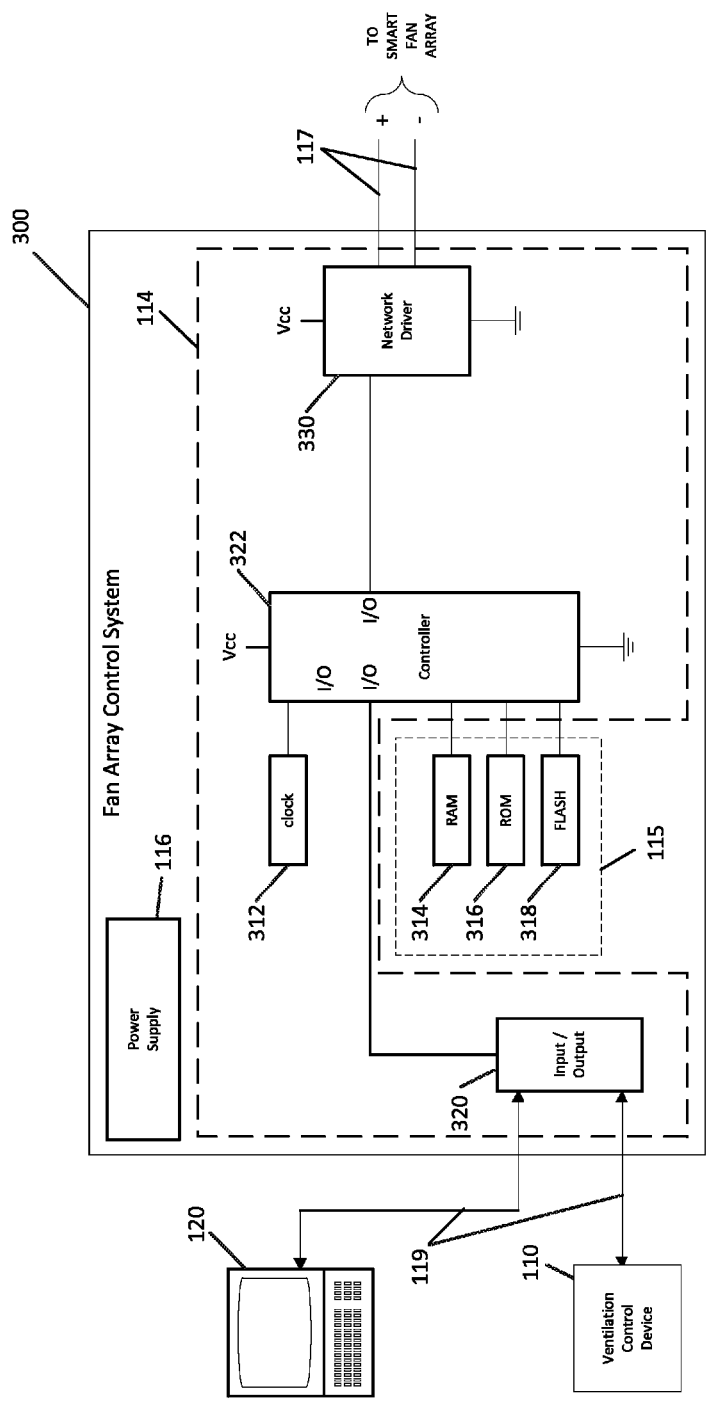
FIG. 3 discloses in greater detail the smart fan array control system shown in FIG. 1.

Referring additionally to FIG. 3, the smart fan array control system 300 is further shown generally comprising a control logic and interface controller 114. The interface controller 114 further comprises a microcomputer controller 322 having various input/output pins, a system clock 312, an input/output interface logic unit 320 and a network driver 330 which provides control signals multiplexed onto the power lines of the smart fan array's local operating network 117. The smart fan array controller 300 also comprises configuration and data storage 115 further comprising RAM 314, ROM 316 and FLASH Memory 318. The smart fan array controller 300 also preferably comprises an on-board power supply 116.

Figure 4:
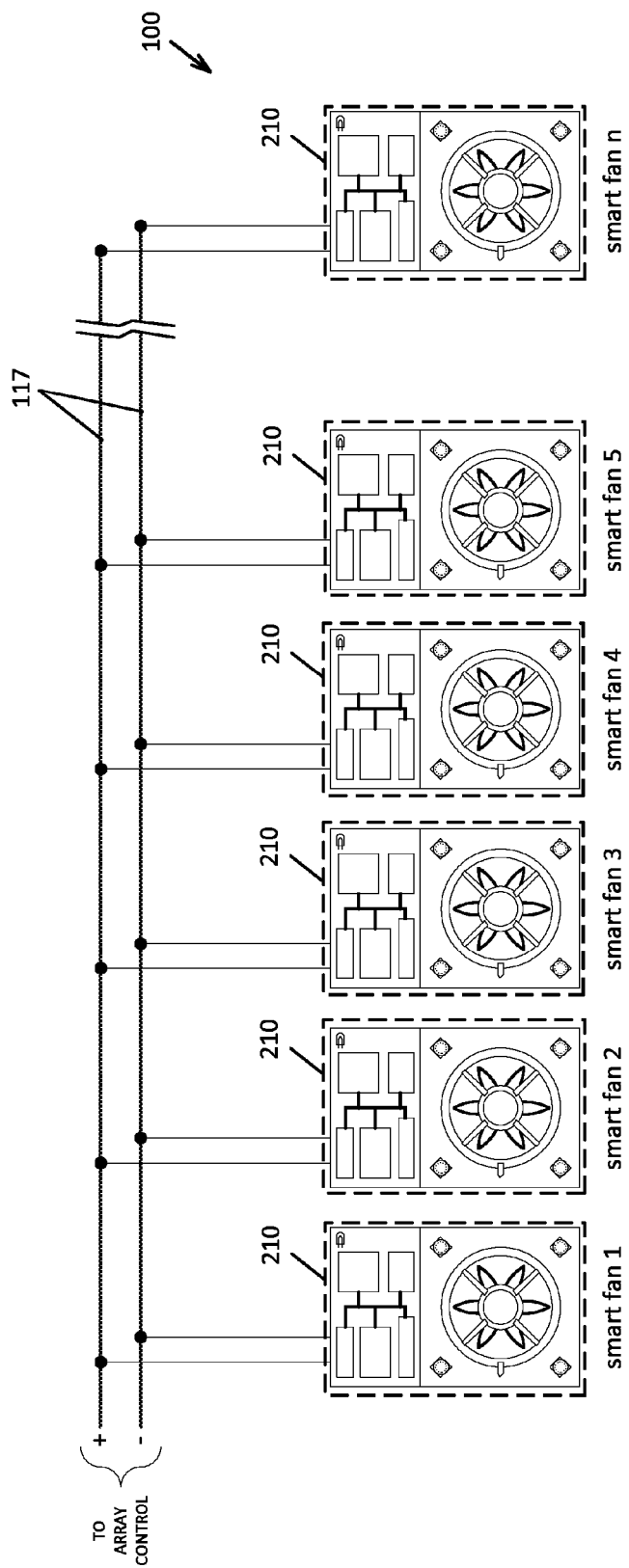
FIG. 4 discloses a smart fan array on a power bus having multiplexed control signaling and extending from the smart fan array control system shown in FIG. 3.

Thus, as shown in FIGS. 3 and 4, the smart fan array controller 300 preferably communicates via power line carrier communications with each of the smart fans 210 over a power bus 117 comprising a negative side of the power line and a positive side of the power line. The communication commands are preferably multiplexed onto the power lines 117 such that each smart fan 210 and the smart fan array controller 300 send and receive commands over the power line 117.

Smart Fan Hardware

Figure 2A:
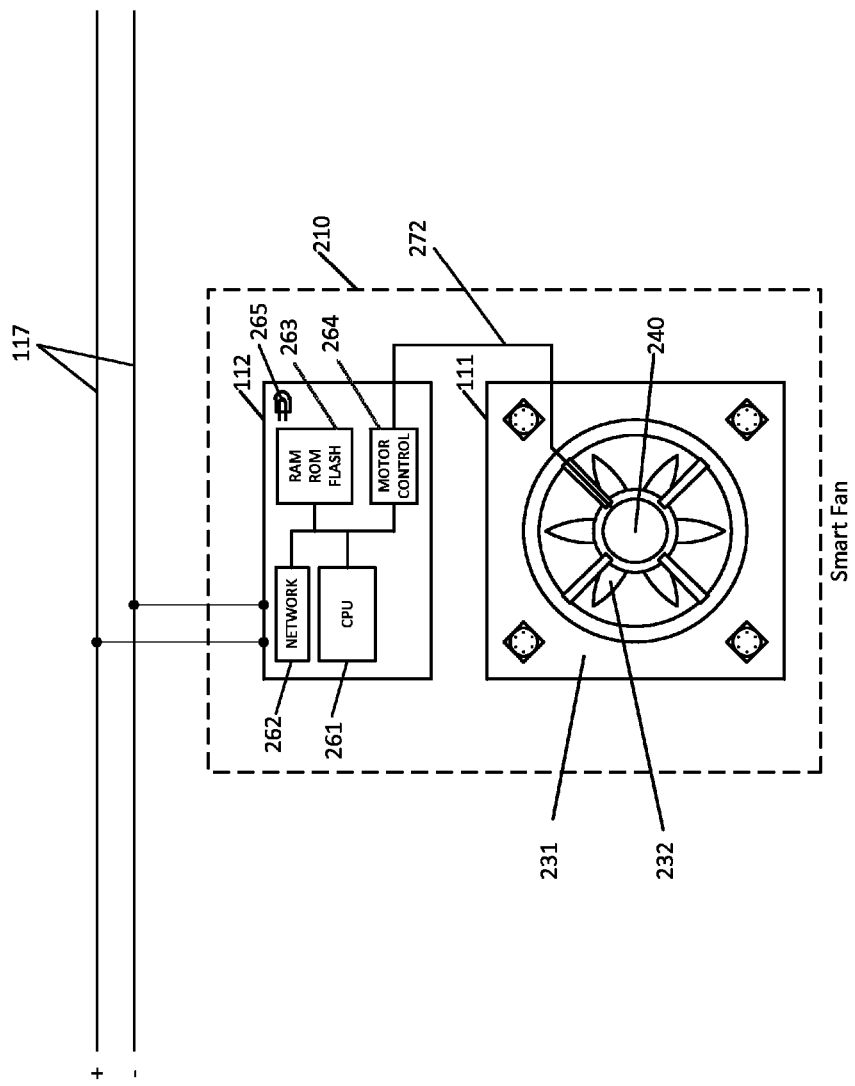
FIG. 2a discloses a block diagram of a smart fan having on-board control, processing, data storage, monitoring and network interface in accordance with another aspect of the invention.

Referring specifically to FIG. 2a, the electronics of each smart fan 210 is disclosed in accordance with an embodiment of the invention. Each smart fan 210 comprises a fan 111 and a controller 112. Each fan 111 preferably comprises a motor 240, a housing 231 and fan blades 232. Each smart fan 210 further comprises on-board control logic 112 that preferably further comprises a network interface 262, a central processing unit (CPU) 261, a fan motor control unit 264, a configuration and data storage unit 263 comprising RAM, ROM and/or FLASH memory; and preferably an error indicator light emitting diode (LED) 265 for easy visual identification of a failed fan. Control signals are sent and received at the network interface 262 via power carrier communications over the local operating network 117. The logic necessary for a smart fan controller 112 may be suitably comprised of a single microcontroller integrated circuit device. While power carrier communications is a preferred embodiment of sending control and power signals to smart fans over operating network 117, the same power and signaling could be carried over separate wires if desired, or power could be carried over one wire and control could be carried wirelessly, all without departing from the true scope and spirit of the invention.

Each smart fan 210 further comprises communication means for communicating between the on-board controller 112 and the fan 111. As shown in greater detail in FIG. 2a, the motor control 264 communicates with the motor 240 via wire 272.

Figure 2B:
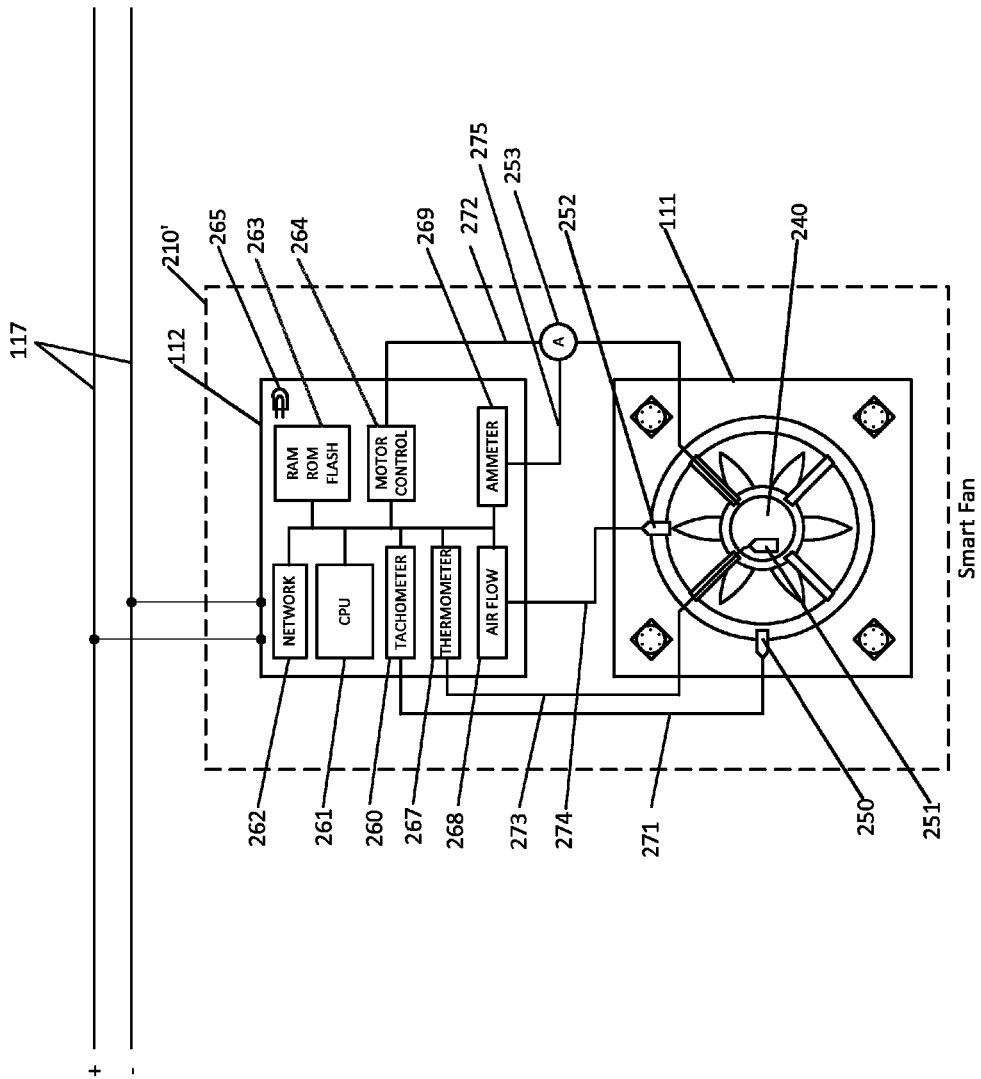
FIG. 2b shows an alternate embodiment of a smart fan in accordance with the invention.

Referring now to FIG. 2b, an alternate embodiment of a smart fan 210' is shown. Smart fan 210' comprises the same fan hardware, and similar network interface 262, CPU 261, configuration and data storage unit 263 and motor control 264 as smart fan 210, but smart fan 210' further comprises a fan speed sensor 250, fan temperature sensor 251, cubic feet per minute airflow sensor 252 and current consumption sensor 253. Smart fan 210' further comprises a tachometer 260, thermometer 267, an air flow meter 268 and an ammeter 269, interconnected by wires 271, 273, 274, 275 respectively, and of course the network interface 262 and the CPU 261 are adapted for reporting and receiving data and signals associated with these added components. These added components give the smart fan 210' additional miscellaneous sensing and reporting capability, and corresponding algorithms to make use of these components may be developed by those of ordinary skill in the art for further displaying data, controlling, operating and managing such a smart fan. Of course, it will be appreciated that still other sensors, such as gas or smoke sensors, and controls, such as auto shutoff of fans in the event of a fire, or increased ventilation to remove hazardous gases, may be incorporated into a smart fan in accordance with the invention, and per equipment manufacturer programming, for allowing monitoring, displaying data, reporting, operation and management of other miscellaneous fan functions by adding further protocol element functions to protocols of the present invention without departing from the true scope and spirit of the present invention.

As shown in FIGS. 1 and 4, a smart fan array 100 may comprise a plurality of smart fans 210 in accordance with the demands of the target environment and system design considerations of needed ventilation and redundancy as suggested with the designation of smart fan 1, smart fan 2, smart fan 3 . . . smart fan n, where n equals the number of smart fans in the array. A smart fan array 100 may consist of any known type of fan combined with onboard control, memory and interface hardware.

Thus, the fan array 100 used in connection with the described primary embodiment fan array controller hardware may be comprised of virtually any type of fan that is amenable to being monitored by onboard fan sensors of the type described. Such fans include, but are not limited to, axial fans, propeller fans, fans with different pitched blades, variable pitched blade fans, centrifugal fans and radial fans in all their varieties.

Further, such fans would include a range of sizes of fans ranging from smaller fans as may be used in a computer housing, perhaps more moderately sized fans, as may be used to ventilate under and on the roof of a residential structure, or larger fans as may be used to ventilate a larger area, for example for housing mainframe computing equipment. Thus, for example, a smart fan array in accordance with the present invention may be suitably used to ventilate attic or vent chute space from along a ridge line of a roof ridge ventilation system comprising a relatively large number of solar-powered fans. Or, the system is also suited for ventilating computer rooms or electrical cabinet enclosures. Still further the system is suited for ventilating areas where hazardous gases are used and anywhere that consistent and reliable ventilation is required.

Alternate Embodiment Fan Array and Array Controller
Array Controller Hardware

Figure 5A:
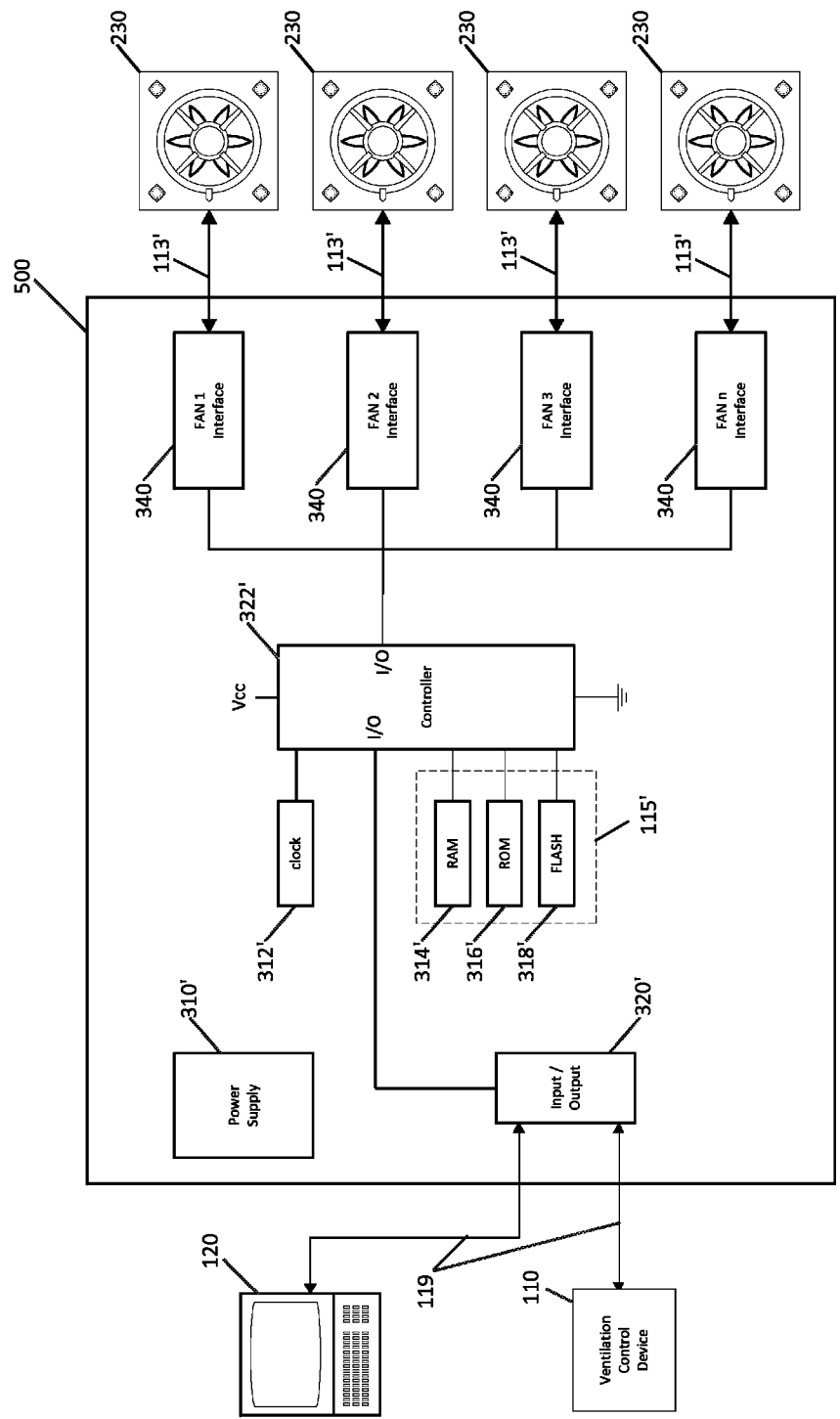
FIG. 5a discloses an alternate embodiment of a smart fan array control system with integrated fan control electronics.

Referring now to FIG. 5a, an alternate embodiment of a smart fan control system 500 having integrated smart fan logic onboard the control system is shown. Similar to smart fan control system 300, smart fan control system 500 comprises a microcontroller 322' having various input/output capabilities, a system clock 312', an input/output interface logic unit 320', and configuration and data storage 115' further comprising RAM 314', ROM 316' and FLASH Memory 318'. Smart fan array controller 500 further comprises a plurality of fan control logic and interface units 340 for communicating with fans 230, the fan control logic and interface units being integrated onto the fan array controller. Wiring 113' of the smart fan control system 500 generally refers to the wiring harness interposed between each fan control logic and interface unit and respective fan 230.

Figure 5B:
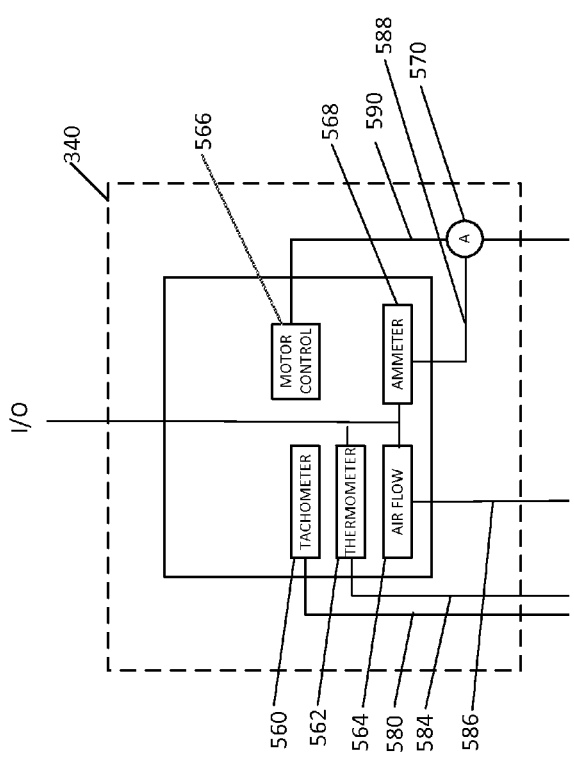

Referring more specifically now to FIG. 5b, each fan control logic and interface unit 340 comprises at a minimum a fan motor control unit for applying power via power line 590 to the fan in response to an on request delivered from an external controller, such as ventilation control device 110, via CPU 322', or removing power from the fan in response to an off request. Further, fan control logic and interface unit 340 may also contain one or more of a tachometer interface 560, a temperature sensor (thermometer) interface 562, an ammeter interface 568 and an airflow sensor interface 564, depending upon a fan's particular capabilities, where different fans may be used in the same system, since some fans may have more capabilities than others. The added features of fan control logic and interface unit 340 mentioned above perform their respective designated functions and intercommunicate between sensors on the fan 230 via tachometer line 580, thermometer line 584, ammeter line 588, and air flow sensor interface line 586, to allow monitoring, display and use of these features as may be desirable in a particular application.

Fan Array

The fan array used in connection with the described alternate embodiment fan array controller hardware may be comprised of virtually any type of fan, not a smart fan per se, but any type of fan that is amenable to being externally monitored by sensors of the type described. Such fans include, but are not limited to, axial and propeller fans with different pitched blades, or centrifugal or radial fans in all their varieties. Thus, the fans in the array may be smaller fans as may be used in a computer housing, smaller to moderately sized, as may be used to ventilate under and on the roof of a residential structure, or larger as may be used to ventilate a large data storage room or building containing sensitive and expensive computing equipment.

System Logic and Processes

System Static Data Values

Figure 6:
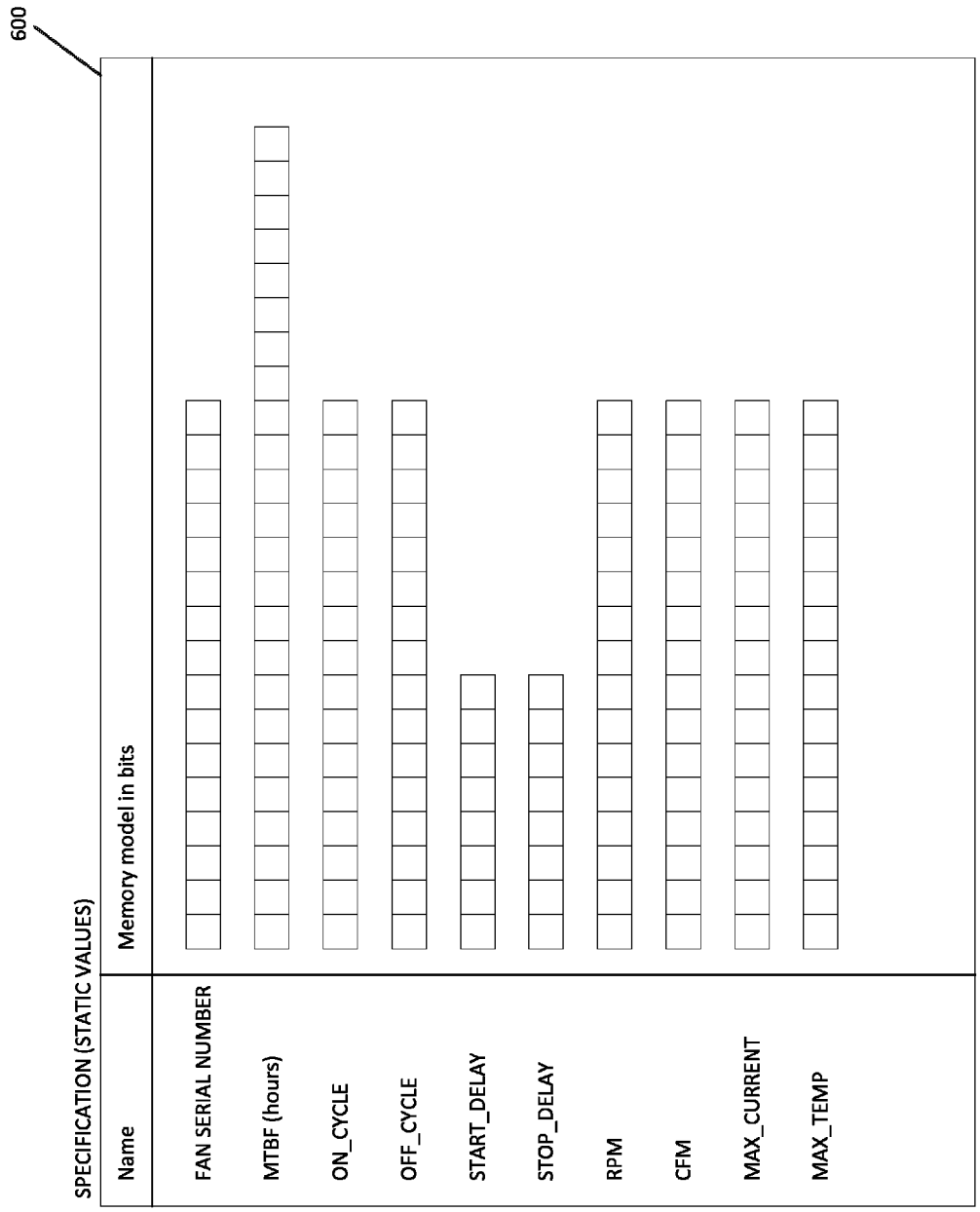
FIG. 6 is a table representing storage in computer readable memory of each type of manufacturer-supplied static fan data for each fan in an array.

Referring now to FIG. 6, a table of individual fan static values is presented demonstrating principal types of static data used by the software processes of the system illustrated by FIGS. 8 through 12. The table of FIG. 6 gives not only a suggested name for each data element, but a suggested size in bits for each data element as well. The suggested size in bits for each data element is represented by data value placeholder squares, one bit being represented by each square, as shown in the table. It will be appreciated by those of ordinary skill in the art that, while a representative number of bits as placeholders have been provided, other sized placeholders may be used without departing from the scope and spirit of the invention as claimed.

A fan serial number, suggested 16 bits, is included among the static fan data values to ensure correlation of other fan data with the correct fan, it being the case that the system enables use of multiple different types of fans, each fan potentially having different MTBF, duty cycle, RPM, CFM and other capabilities than other fans in the array. Also, importantly, the fan serial number is used by the system in activating, deactivating, addressing or reading information from a specific fan, as designated by its serial number.

A fan's MTBF in hours, suggested 24 bits, is recorded and tracked to ensure knowledge of when a fan has exceeded its MTBF and is prime for replacement. Thus, as further described below in connection with dynamic fan data, a particular fan's current total time in use may be compared with its rated MTBF to suggest replacement and perhaps limited further use strategies, given the status of other fans, and their data, as determined by system logic.

The on_cycle static fan data value, suggested 16 bits, specifies the duty cycle for selected smart fans expressed as the maximum number of seconds a fan can be on before it needs to be placed in a resting state as determined by other program logic for the system. Thus, as further described below, if a particular fan has been on longer than its rated on_cycle static fan data value indicates it should be, as determined by program logic, and there are other fans in the array that are available in rest, or off_cycle, mode, then the system would logically select such another fan to meet demands of the target environment.

The off_cycle static fan data value, suggested 16 bits, specifies the amount of time, in seconds, that a fan should remain at rest before being returned to service. Of course, if an emergency were to exist, and the only fan that was available to meet demands of the target environment, then, as further described below, the system should be enabled to override the off_cycle time requirement.

The start_delay static fan data value, suggested eight bits, specifies the minimum amount of time, in seconds, that a selected smart fan needs to spin up to full speed once power is applied to the fan motor control circuit, whereas the stop_delay value, suggested eight bits, specifies the minimum amount of time in seconds that the selected smart fan needs to come to a full stop once power is removed from the motor circuit. These values are useful for appropriate timing sensing fan performance, and thus usage of sensed fan performance data, to be sure that essentially inaccurate data is not collected during fan spin-up or spin-down, during which times the fan would be operating at less than full capacity.

The RPM static fan data value, suggested 16 bits, specifies the manufacturer rated rotational speed, in revolutions per minute, for a selected smart fan when it is operating at full speed as designed by the fan manufacturer. This parameter may be used as an indicator, as compared to a fan's actual RPMs, to provide a clue as to an imminent fan failure.

The CFM static fan data value, suggested 16 bits, specifies a fan's rated functional capacity for moving air measured in cubic feet per minute of air flow as expected from a selected smart fan when operating at full speed according to its manufacturer's design specifications. This rated capacity may be used in comparison with actual fan CFM as measured from a sensor on, or near, the fan to enable monitoring of fan performance.

The max_current static fan data value, suggested 16 bits, specifies a fan's rated maximum amount of current in milliamps that a manufacturer's specification indicates a selected fan would draw under normal operating conditions. Further, the max temp static fan data value, suggested 16 bits, specifies a fan's rated maximum amount of temperature, preferably in degrees centigrade, that a manufacturer's specification indicates a selected fan will produce under normal operating conditions. These data values are useful to further monitoring the performance of a particular fan, comparing actual fan performance data with such rated fan data, to determine if a failure of the particular fan is imminent.

The static fan data values described above, including fan serial number, MTBF in hours, on_cycle, off_cycle, start_delay, stop_delay, rotations per minute (RPM), cubic feet per minute (CFM), maximum current and maximum temperature, are used by the various system routines to determine which fans to turn on and which fans to turn off when responding to commands from an external controller pursuant to the goals of the system to efficiently utilize MTBF hours.

System Dynamic Data Values

Referring now to FIG. 7, there is provided a table setting forth system dynamic fan data values, there being a set of such static fan data values associated with each fan, as would be indicated, for example, by the value name fan[id].temp, designed to hold the operating temperature of a given fan at a particular time. These values comprise fan performance-related data as measured by on-board, or remote, sensors and are used as described further herein in connection with static, manufacturer's specification values to determine how best to deploy a smart fan array, or array controller, to achieve the goal of increased MTBF of an overall fan array. Not only are the dynamic data values given in the table, but also a suggested number of bits, represented by the data value placeholder squares, one bit being represented by each square.

A dev_ID is a dynamic fan data value, suggested eight bits, that provides temporary fan ID numbers that are assigned, preferably sequentially, one number to each fan, during initialization of the system for allowing easy referencing of the fan and its related data in determining fan usage and allocation. Of course, if more than 256 fans are required for a given application, then the dev_ID field could be easily expanded to 16 bits to accommodate the larger number of fans to be identified.

A life dynamic fan data value, suggested 24 bits, represents the percentage remaining lifetime of a selected fan, a calculation based on the time-in-use (hours_used) of the fan divided by the fan's mean-time-between-failures (MTBF). The value is conveniently expressed as a value between zero and 65,535, where zero represents zero percent (0%) fan lifetime left, and 65,535 represents one hundred percent (100%) fan lifetime left. This data is useful to allow determination by the system of which fan is best suited for deployment, or for return to a resting state.

A hours_used dynamic fan data value, suggested 24 bits, represents the total number of hours of operation for a selected smart fan. This value is then used, among other things, to calculate the fan percentage life remaining.

A motor dynamic fan data value, suggested eight bits, is used to represent a detected value of on, or off, for a given fan. Of course, this is used by program logic to determine which fan, or fans, to turn on or off responsive to a given request.

A status dynamic fan data value, suggested eight bits, represents one of six specified, and up to 256, different status values, including active, when the fan is running at speed, inactive, when a fan is off, and available, resting, when a fan is off and unavailable, failure, when a fan has failed, spinup, when a fan has started but is not yet at speed, and spindown, when a fan is stopped, but still moving. These various status values enable the program logic to function to determine whether a fan is in use, or not, available or not, or otherwise struggling, in order to allow making of a determination of how the fan may continue to be used, or not used, in meeting system requirements.

A speed dynamic fan data value, suggested eight bits, is used to represent the current fan speed, expressed as a percentage of total possible RPMs that is calculated by dividing current fan RPMs by maximum RPMs and multiplying the quotient times 256, as such may be desirable to enhance array life in a given situation or for other monitoring or reporting purpose. Current system logic does not consider current individual fan speed in enhancing fan array life since, currently, manufacturer specifications for enhanced array life do not account for lower than full fan speed scenarios. However, it will be appreciated that implementation of such for the purpose of monitoring or display or other program purpose is contemplated within the scope of the invention, and if such were to be implemented in a future process for enhancing system life it would not depart from the true scope and spirit of the invention.

A start_time dynamic fan data value, suggested 24 bits, based upon the value of the system clock 312, represents the time in seconds a selected fan was started, thus enabling calculation of hours used, fan life, fan status, and the deployment, or discontinuance, of a particular fan in the array.

An air_flow dynamic fan data value, suggested 16 bits, represents the current airflow, in cubic feet per minute (CFM) as monitored by the selected device's air flow sensor 252, being produced by a particular fan and may be used for monitoring, other program, and/or reporting purposes.

A current dynamic fan data value, suggested 16 bits, represents the amount of current being used presently by a particular fan in the system and may be used for purposes of predicting impending fan failure.

A temperature dynamic fan data value, suggested 16 bits, represents the operating temperature, preferably in degrees centigrade as measured by the selected device's temperature sensor 251, of a fan and may be used for reporting, monitoring or other programming purposes, for example to detect possible impending fan failure.

A use_cycles is an integer value representing the number of times a fan has been turned on, and this, in turn, may be used for monitoring, reporting and determining metrics regarding fan usage relative to other fans in the array.

System Routines

POST and Initialization Routines

Figure 8:
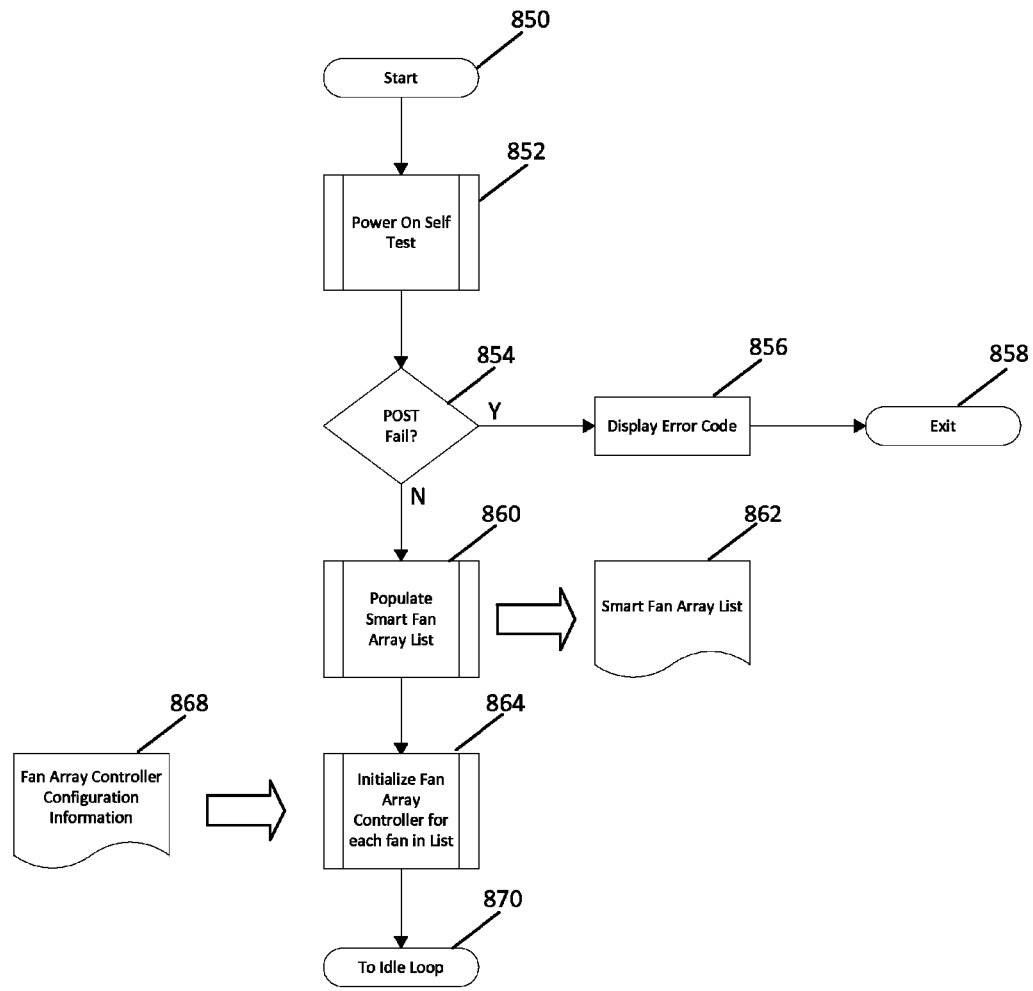
FIG. 8 discloses an initialization sequence for a smart fan array controller in accordance with another aspect of the invention.

Referring to FIG. 8, before receiving commands and immediately after power is applied to the system, at 850 the system processes of the smart fan array controller 300 are initiated with a power-on-self-test (POST) 852 which reports error or success status of system startup. The POST 852 verifies the existence and functionality of the various components of the smart fan array controller and system to ensure proper operation. At decision diamond 854, the system determines whether there was a failure in the POST, an error code is displayed or logged at 856 and the system routine is terminated at 858, the system will not do anything further, and the system will require service in accordance with the error code generated. An LED or other display 265 means on the smart fan array controller 300 may blink or show an appropriate error code depending on the failure mode of the smart fan array controller.

If the POST 852 is successful as determined at decision diamond 854, system control passes to a next routine 860 which discovers the number of smart fans 210 connected to the system array bus and populates a smart fan array list 862 with static and dynamic values associated with individual fans. This is accomplished by sending a poll command over the network power bus 117 to find the number of smart fans 210 connected on the array bus. The smart fan array controller 300 then waits for responses from smart fans 210 on the bus 117 and adds them to the list of smart fans the smart fan array controller can control.

Next, at routine 864 the smart fan array controller checks memory 868 on board the smart fan array controller to see if it has configuration parameters to read and store into system array controller memory. Such parameters may include configuration and status data for existing fans or the controller that were stored prior to a previous shut down or manually configured via an external system such as computer 120.

After the smart fan array controller finishes loading parameters for the smart fans on the array bus, the smart fan array controller passes control to an idle loop 870. Thus, when the smart fan array controller 300 finishes initialization, it is ready to begin controlling the smart fans 210 on the array according to commands received from an external device 110 or 120. Since each smart fan 210 includes a fan 111 and corresponding electronics 112 to handle the communications with the smart fan array controller 300, each smart fan is able to communicate with the smart fan array controller. Communication between a controller 300 and smart fans 210 may be generally multiplexed over power lines 117 using power line communications, but in an alternate embodiment, such may be communicated over twisted pair wiring, radio frequency (RF) communications, infrared communications, optical communications or other network topologies.

Idle Loop and Command Execution Routines

Figure 9:
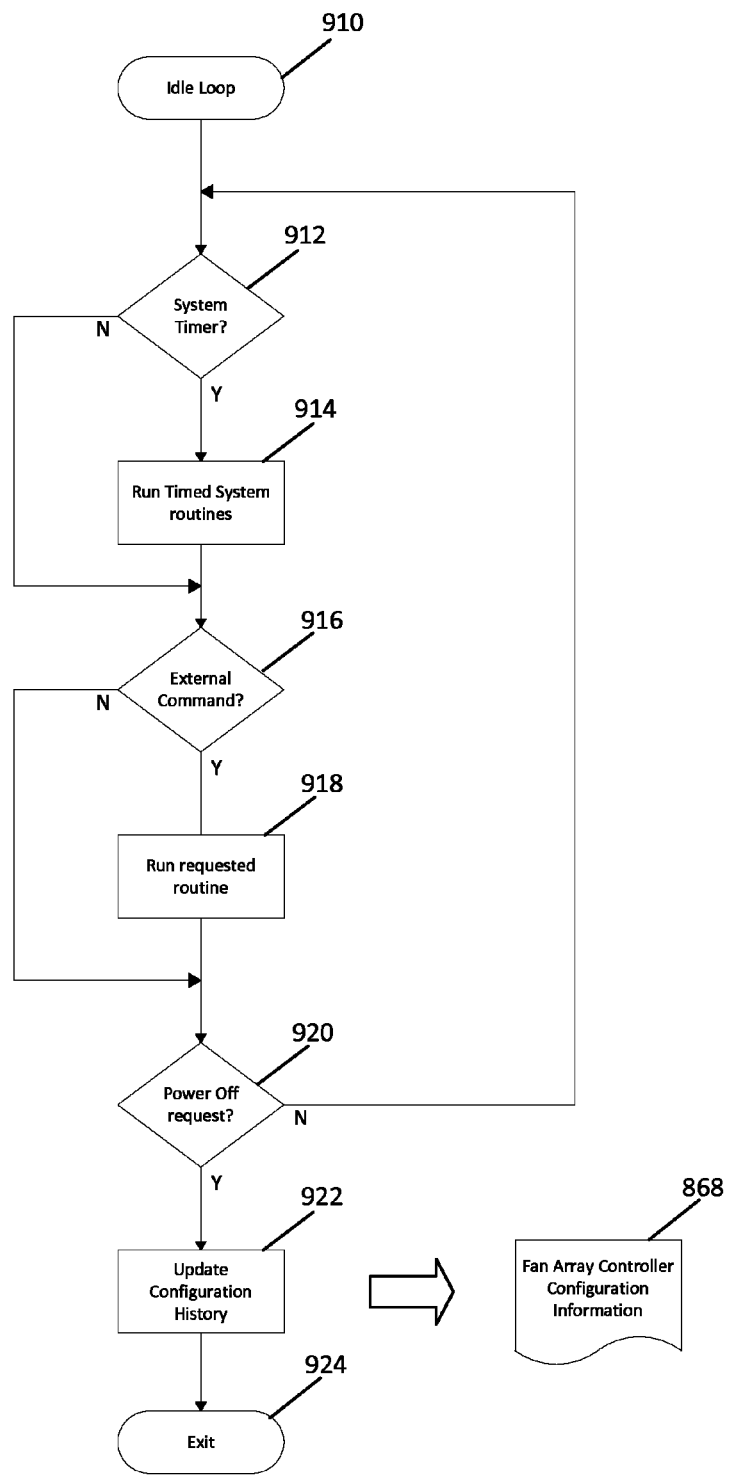
FIG. 9 discloses an idle loop sequence for system and external command processing by a smart fan array control system.

Referring now to FIG. 9, which shows an idle loop routine 910, the system begins processing commands as shown from an external controller and responds to internal system events. At decision diamond 912, the smart fan array controller checks for system timer events. These events occur at programmable intervals depending on the performance constraints of the fans in use. Thus, for example, when a fan is turned on, a timer for a system event, such as recycle array (described further herein) is started. When the timer that has been set to a predetermined amount of time counts down to zero, as determined at 912, the execution of the event (i.e., turning off the fan by the recycle array routine) occurs at 914. After the event runs, execution of the idle loop 910 continues at decision diamond 916.

At decision diamond 916, the smart fan array controller checks if there has been received an external command, such as add ventilation or subtract ventilation, from the ventilation control device, such as a programmable thermostat 110. If an external command, such as add ventilation, has been received, the requested routine is executed at 918 by turning on an appropriate fan in accordance with system protocols for enhancing life of the fan array. While there are a large number and types of potential external commands, depending on the operational environment and goals of the overall system, a set of specific appropriate commands are set forth and described further in connection with FIGS. 14 and 15.

After processing the commands which have been issued to the smart fan array controller 300 or 500, the smart fan array controller checks as shown at decision diamond 920 to see if there has been a request for the smart fan array controller to power off. If so, smart fan array controller executes an update configuration history routine at 922 to update the fan array controller configuration information in local storage 868 and the controller is powered off at 924. Otherwise, if a power off command was not received at decision diamond 920, the smart fan array controller loops back and begins again checking if there has been a system timer event at 912.

Add Ventilation Routine

Figure 10:
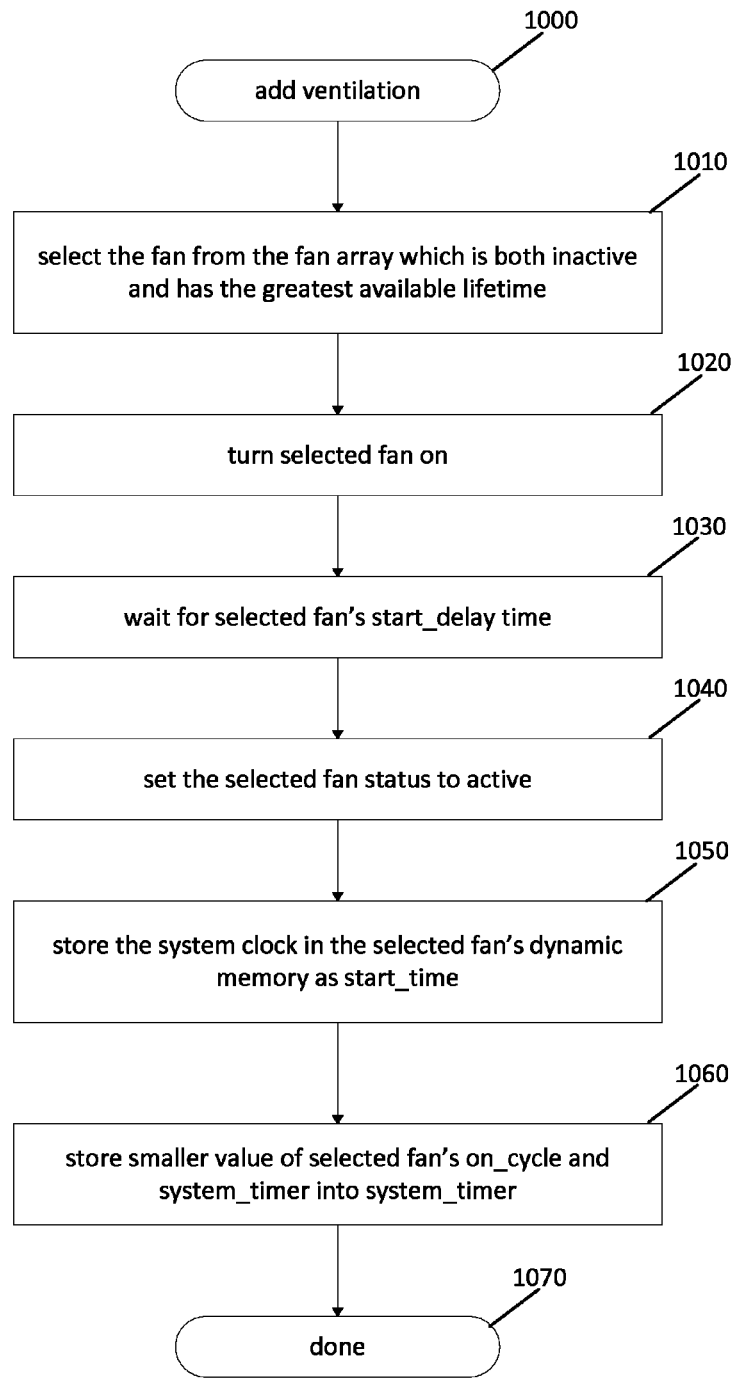
FIG. 10 discloses a process by which a smart fan array controller adds ventilation to a target area by turning on a fan in accordance with system logic for optimizing life of the fan array.

Referring to FIG. 10, there is shown an add ventilation routine of the fan array control system. When an add ventilation command is received from an external device 110, 120 by the smart fan array controller 300, execution of the add ventilation routine is begun at 1000. At 1010, the routine queries all of the smart fans 210 that are inactive and selects the inactive smart fan which has the most remaining lifetime hours. The selected smart fan 210 is commanded to turn on as shown at 1020. The smart fan array controller 300 waits for the start_delay time, the amount of time required for the smart fan 210 to start and spin up to full speed, as shown at 1030, and then the controller sets the status of the selected fan to active, as shown at 1040. The smart fan array controller 300 obtains the current time from the system clock 312, and the smart fan start time is preferably recorded in the smart fan's local dynamic storage memory 263. The system timer is updated at 1060 by selecting the smaller value of either the selected fan's on_cycle or the current value in the system timer, whichever is less, and storing that value back in the system timer. This ensures that the system timer will reach zero and cause a system event to execute at the earliest available interval, thus ensuring that a duty cycle of a fan is not exceeded. At 1070, the add ventilation routine command is completed.

Subtract Ventilation Routine

Figure 11:
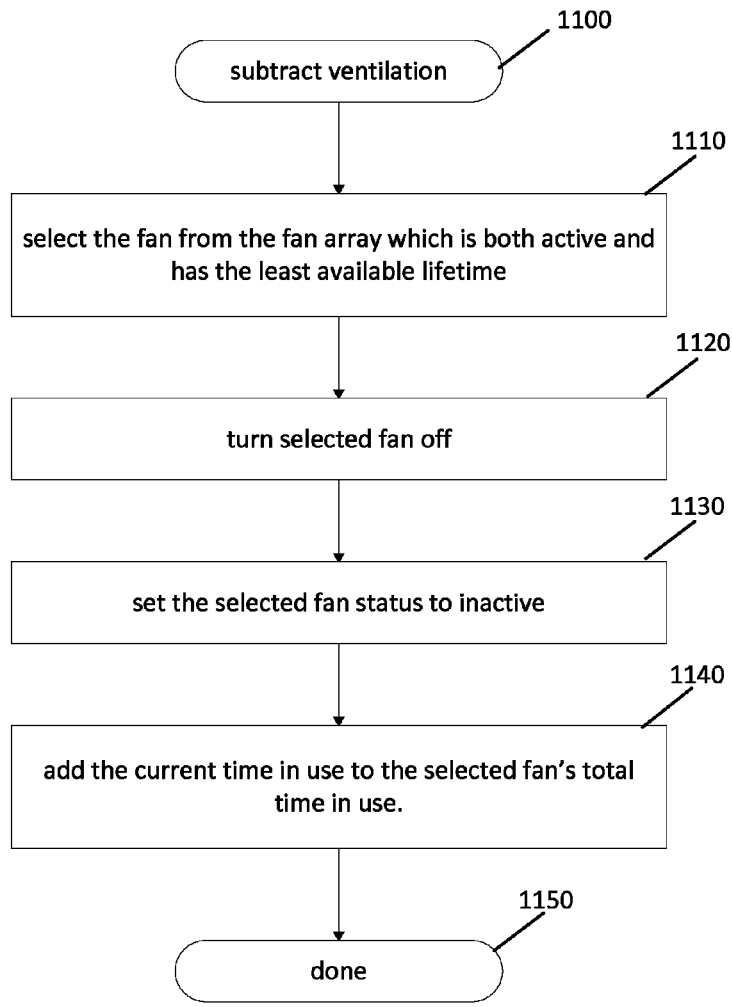
FIG. 11 discloses a process by which a smart fan array controller subtracts ventilation to a target area by turning off a fan in accordance with system logic for optimizing life of the fan array.

Referring to FIG. 11, there is shown a subtract ventilation routine. When the subtract ventilation command is received by the smart fan array controller 300, the routine is initiated at 1100. The routine queries all of the smart fans 210 for which the fans' status is currently active and selects from such active smart fans the fan which has the least available lifetime hours remaining, as shown 1110. The selected smart fan 210 is then turned off, as shown at 1120. The smart fan array controller 300 then sets the status of the selected fan to inactive as shown at 1130 and adds the current time in use to the selected fan's total time in use at 1140. The routine then terminates at 1150.

Recycle Array Routine

Figure 12:
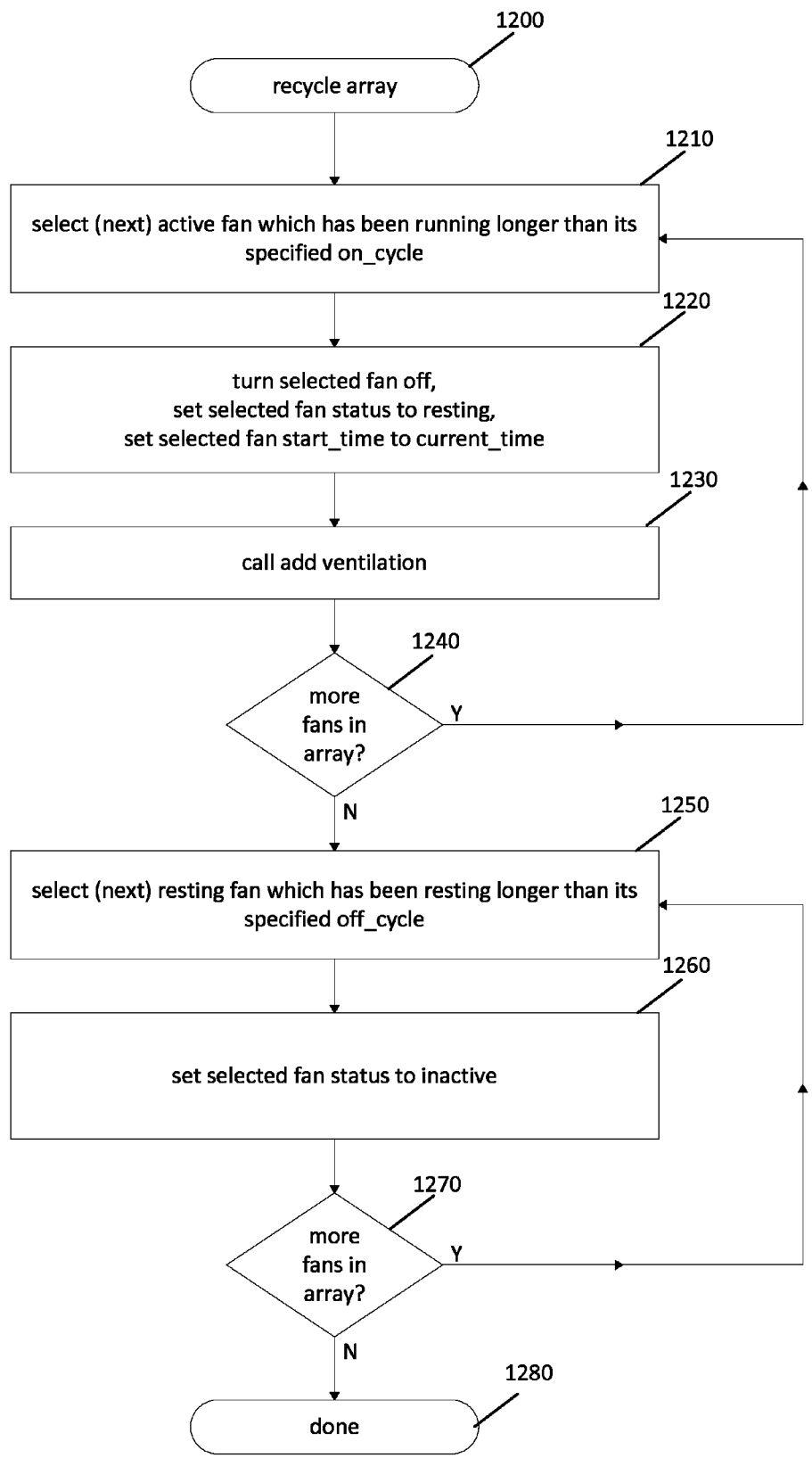
FIG. 12 discloses a process for periodic re-determining of fan deployment within a fan array in accordance with system logic for optimizing life of the fan array.

The smart fan array controller 300 periodically recycles the smart fan array according to the routine shown in FIG. 12. The recycle routine is called and initiates execution at 1200 when the system timer reaches zero. At 1210, the recycle routine selects a next active smart fan 210 in the array that has been running longer than its specified on_cycle time. Since the selected smart fan's on_cycle time has been exceeded, at 1220 the recycle routine turns the fan off, sets the selected fan's status to resting, indicating that the fan needs to rest for the prescribed off_cycle time before putting the fan back into active service, and sets the selected fan's start_time to the current_time obtained from the system clock. At 1230, the recycle array routine replaces the smart fan 210 removed from service with a next available smart fan by calling the add ventilation routine. The aforementioned process continues at decision diamond 1240 if there are any more active smart fans 210 in the array to check. If there exists another smart fan 210 to check, the steps 1210 through 1230 are repeated.

If there are no more smart fans 210 in the array to check for active status, the recycle array routine continues at 1250 to cycle through the array of smart fans and selects a next resting fan which has been resting longer than its specified off_cycle. At 1260 the recycle array routine changes the status of the selected smart fan 210 from resting to inactive, indicating the fan is now available for use. At decision diamond 1270, the recycle array routine determines if there are any more smart fans 210 in the array to be checked for resting status. If so, the recycle routine continues by repeating steps 1250 and 1260 for each additional smart fan 210. If there are no more smart fans 210 to check in the array, the recycle array routine terminates. The recycle array routine helps ensure that a smart fan 210 does not run longer than the manufacturer specified duty cycle for the fan, thus extending fan lifetime.

Thus, in summary, for each smart fan in the array that has been running longer than its' specified on_cycle, the smart fan is commanded to turn off, and the fan is placed in a state where it will not get turned back on until it has rested for its specified resting time, and it is replaced with another fan by a call to the add ventilation routine. Further, the recycle routine ensures that once a fan has reached its specified resting period, its status is changed from resting to inactive, making it available for service if called by the add ventilation routine. This ensures that the recycle array command does not itself increase or decrease ventilation to the target environment and ensures that the next time the recycle routine is executed, there are fans ready to be added to the ventilation workload when other fans need to be rested. The recycle array routine periodically adjusts which fans are deployed to meet ventilation requirements set by an external system and in accordance with system parameters for extending the life of the fan array.

Referring to FIG. 13, there is shown a protocol element reference key to aid in understanding the command protocols for the software processes of the present invention. In the reference key, the name, or description, of each protocol is listed on the left-hand side, and the symbol is listed on the right-hand side. While the size of a particular protocol element depends upon the particular implementation, it is understood generally that each element represents a series of on/off signals, preferably carried on a power line 117 in accordance with power line carrier communications protocols, the series of on/off signals being unmistakable in computer language terms and to those of skill in the art as indicating the appropriate element in a command sequence of elements. The static data block and dynamic data block elements are shown on FIG. 13 as being of a larger size to indicate that they carry all of the static data, or dynamic data, respectively, represented by the bit representations shown on FIGS. 6 and 7 respectively.

A list of protocol elements and their descriptive names is given for convenience: ATN indicates attention, which is always the first protocol block of all smart fan array controller communications and signals to all smart fans 210 in the array 100 that the smart fan array controller 300 has begun a communication to one or more fans in the array;

POL indicates Poll Request, which is a protocol block used to request each smart fan 210 report its identity to the fan array controller 300;

RSD indicates Read Static Data Block, which is a protocol block the smart fan array controller 300 uses to request that a smart fan 210 reply with all data that is contained in the static data block for the fan;

RDD indicates Read Dynamic Data Block, which is a protocol block the smart fan array controller 300 uses to request that a smart fan 210 reply with all data that is contained in the dynamic data block for the fan;

DON indicates Device On, which is a protocol block sent by the fan array controller 300 to direct an individual smart fan 210 to start its motor;

DOF indicates Device Off, which is a protocol block sent by the fan array controller 300 to direct an individual smart fan 210 to stop its motor;

AON indicates All On, which is a protocol block sent by the fan array controller 300 broadcasting to all smart fans 210 in the array 100 to start their motors;

AOF indicates All Off, which is a protocol block sent by the fan array controller 300 broadcasting to all smart fans 210 in the array 100 to stop their motors;

DAT indicates Device Attention, which is a protocol block sent by an individual smart fan 210, almost always in response to a request from the smart fan array controller 300, indicating the smart fan is in the process of sending a response to a request from the controller. Device attention is always followed by the DEV number of the smart fan sending the response;

SUS indicates Success, which is a protocol block sent by a smart fan 210, along with its DEV number, indicating successful completion of a previously received command from the smart fan array controller 300;

FAL indicates Fail, which is a protocol block sent by a smart fan 210, along with its DEV number, indicating failure of completion of a previously received command from the smart fan array controller 300;

WDD indicates Write Dynamic Data Block, which is a protocol block the smart fan array controller 300 uses to send data to a smart fan 210 that is to be stored in the in the dynamic data block for the fan;

SPE indicates Speed, which is a protocol block that is used to set the speed of a particular smart fan 210;

CHK indicates Checksum, which is a protocol block that is used to verify the integrity of data in a system message or data block;

END indicates End, which is a protocol block used by a smart fan 210, or a smart fan array controller 300, to indicate the end of a system message block;

DEV indicates Device Number, which is a protocol block used by a smart fan 210, or a smart fan array controller 300, to identify the number of a specific fan for which a communication is intended, or to indicate the number of a specific fan from which a communication has been sent;

SDB indicates Static Data Block, which is a protocol block used by a smart fan 210 to include responsive data as indicated and described in connection with FIG. 6; and DDB indicates Dynamic Data Block, which is a protocol block used by a smart fan 210 during a read operation, or sent by a smart fan array controller 300 during a write operation, to include data as indicated and described in connection with FIG. 7.

Referring now to FIGS. 14 and 15, there are shown and described system message blocks which are built from the previously described protocol blocks constituting complete messages from either the smart fan controller 300 or an individual smart fan 210.

A poll devices system message is used by the smart fan array controller 300 to inventory, or roll call, the smart fans 210 in the array 100, to see what fans are present. The request poll devices system message block, ATN|POL|END, is broadcast by the system controller 300 to all smart fans 210 in the array 100 requesting a reply. Each smart fan 210 replies with a DAT|DEV|END system message block to indicate the presence of the fan.

A read static data block system message is used by the smart fan array controller 300 to read an individual smart fan's 210 entire static data block. It is initiated when the smart fan array controller 300 sends a directed read static data request ATN|DEV|RSD|END to a specific fan 210, and the fan responds with a device reply DAT|DEV|SDB|CHK|END.

A read dynamic data block system message is used by the smart fan array controller 300 to read an individual smart fan's 210 entire dynamic data block. It is initiated when the smart fan array controller 300 sends a directed read dynamic data request ATN|DEV|RDD|END to a specific fan 210, and the fan responds with a device reply DAT|DEV|DDB|CHK|END.

A write dynamic data block system message is used by the smart fan array controller 300 to write to an individual smart fan's 210 dynamic data block. It is initiated when the smart fan array controller 300 sends a directed write dynamic data request ATN|DEV|WDD|DDB|CHK|END to a specific fan 210, and the fan responds with either a success reply DAT|DEV|SUS|END or a failure reply DAT|DEV|FAL|END.

Referring specifically now to FIG. 15, the all devices off system message block ATN|AOF|END is a broadcast message sent by the smart fan array controller 300 to all smart fans 210 in the array to turn off all fans in the array. There is no specific device response to this broadcast message.

The all devices on system message block ATN|AON|END is a broadcast message sent by the smart fan array controller 300 to all smart fans 210 in the array to turn on all fans in the array. There is no specific device response to this broadcast message.

The device off system message block ATN|DEV|DOF|END is a directed communication from the smart fan array controller 300 to a specific smart fan 210, commanding the fan to turn off its motor. The smart fan 210 then responds with either a device off success response system message block DAT|DEV|DOF|SUS|END or a device off failure response system message block DAT|DEV|DOF|FAL|END.

The device on system message block ATN|DEV|DON|END is a directed communication from the smart fan array controller 300 to a specific smart fan 210, commanding the fan to turn on its motor. The smart fan 210 then responds with either a device on success response system message block DAT|DEV|DON|SUS|END or a device on failure response system message block DAT|DEV|DON|FAL|END.

Overview of System Operation of Primary Embodiment

Referring now to FIGS. 2a, 2b and 3, an example of system communications of the primary embodiment will facilitate understanding of general operation of the primary embodiment of the invention comprising a smart fan array controller 300 communicating with a plurality of smart fans 210 in a smart fan array 100 over a power line communications local operating network 117. The input processor 320 of the smart fan array controller 300 receives a variety of commands from an environmental controller, such as ventilation control device 110, or a more complex computer 120, including but not limited to, add ventilation, subtract ventilation, all on, and all off commands.

The input processor 320 notifies the primary controller 322 that a new command has been received from the external device. The primary controller 322 processes the command and then implements an appropriate routine for determining which fans 210 need to be turned on or off. As an example, the add ventilation command, which may be received from the ventilation control device, is processed by the primary controller 322 and sent via the network driver 330 to smart fans 210 over the local operating network 117. The primary controller 322 may also refer to its clock in order to determine appropriate times for commanding fans in order to be more consistent with the MTBF requirements of the fans in use. The primary controller also logs events and data in local storage 115, which may be implemented in volatile RAM 314 or non-volatile FLASH 318. ROM 316 is used to store start up routines and the POST.

A smart fan 210 monitors and reads commands over the local operating network 117 through a network controller 262. When a command is received by a particular smart fan 210, the fan's network controller 262 decodes the command and forwards it to the smart fan controller's (CPU) 261. The CPU 261 is programmed to alter the operating conditions of the smart fan 210 to be consistent with the commands received by the network controller 262. For example, if the smart fan 210 is commanded to turn on, the CPU commands the motor control 264 to begin sending power to the fan causing it to function as intended. The smart fan CPU 261 also logs and records the various static data parameters and current dynamic data values for the fan in order to ensure that the fan is operated consistent with its duty cycle and MTBF capabilities.

Further, the smart fan CPU 261 stores all relevant information in the smart fan's local storage 263. These parameters and values include, but are not limited to, duty cycle parameters, recorded operating and resting times, MTBF parameters, RPM values indicated by the tachometer 260 using the rotation sensor 250, air flow values indicated by the air flow interface 268 and sensor 252, current consumed by a fan motor indicated by the ammeter interface 269 and sensor 253, fan motor operating temperature indicated by the thermometer interface 267 and temperature sensor 251, dynamic current fan status, and the number of times the fan has been turned on. Thus, with the primary embodiment of the invention, the smart fan CPU 261 commands the fan 240 to operate consistent with the commands received over the local operating network 117.

Once a smart fan 210 has received and executed a command from the smart fan array controller 300, the fan reports its completion of operation with a directed communication to the controller of success or failure. While the present disclosure teaches commands originating from the smart fan array controller 300, it will be apparent to those of ordinary skill in the art that commands may also originate from a particular fan, such as for example, an overheating condition or other failure mode, wherein the onboard fan CPU 261 initiates a signal to the array controller 300 of the condition of the fan so that the overall system may compensate for the failed or overheating fan without departing from the true scope and spirit of the invention.

Overview of Operation of Alternate Embodiment

Referring to FIGS. 5a and 5b, in another embodiment, the control electronics for the fan array controller 500 and the smart fan control electronics 340 for each fan 230 are all integrated onto the smart fan array controller 500. As for controller 500, processing of external commands from an environmental controller, such as ventilation control device 110, or computer 120, is virtually the same as operation of the controller 300 described above.

In this alternate embodiment of the invention, system commands are implemented by a direct communication between the fan array controller 322' and onboard individual fan interfaces 340 using an onboard computer I/O bus. A wiring harness 113' is implemented between each fan interface 340 and its associated fan 230. The primary controller 322 may also refer to its clock in order to determine appropriate times for commanding fans in order to be more consistent with the MTBF requirements of the fans in use. The primary controller also logs events and data in the local storage which may be implemented in, but not limited to volatile RAM 314, non-volatile FLASH 318. ROM 316 is used to store start up routines and the POST.

As more specifically shown in FIGS. 5a and 5b, communications between fan interface 340 and an associated fan 230, depends upon the capabilities of the fan and related sensors. At a minimum, since such a fan 230 will include a motor wired to the fan interface 340, on/off motor control signals are processed in the onboard controller's 340 motor control circuit 566, which in turn provides power to the motor over a simple power cord 590 to turn on, or turn off, the fan motor. Other previously described operations, such as logging of dynamic fan data, or storage of static fan data, are performed onboard the fan array controller 500 using onboard memory 115' and fan interface 340 to receive data from sensors associated with each fan 230.

Thus, for example, in order to determine whether such an alternate embodiment fan is available for use in response to an add ventilation routine request, the fan's status, as determined by original manufacturer MTBF, on_cycle and off_cycle data, together with remaining fan life, in turn determined from hours_used, are dynamically determined by controller 322'. Additional fan sensor inputs, such as dynamic fan data values for fan temperature, fan speed, air flow and current consumption, may be received at the fan interface 340, and made available for use by fan array controller 322'. These data inputs may further be made available to the ventilation control device 110, or computer 120, for further processing, monitoring or display, all without departing from true scope and spirit of the invention.

While several preferred embodiments of the present invention have been shown and described, it will be apparent to those skilled in the art that many changes and modifications may be made without departing from the invention in its broader aspects. For example, many different types of fans may be used in a wide variety of systems. Additionally, one skilled in the art could program the smart fan array controller with software pursuant to other technical goals. The appended claims are therefore intended to cover all such changes and modifications as fall within the true spirit and scope of the invention.

What is claimed is:

1. A ventilation fan system adapted for responding to an external device making requests for required changes in ventilation to lengthen the life of the system comprising:
   a plurality of ventilation fans, each ventilation fan comprising on-board computer readable memory for storing static fan on-cycle specification data and dynamic fan status data comprising at least fan time-in-use data; and
   a fan array controller operatively interconnected to said plurality of ventilation fans and the on-board computer readable memory, said fan array controller adapted for sending and receiving signals to and from each of said ventilation fans, said fan array controller being further adapted for receiving requests and sending status to and from the external device, wherein each said ventilation fan is adapted for selectively responding to control and fan on-cycle and time-in-use data requests received from said fan array controller, and wherein said fan array controller meets ventilation demands by turning on at least one of said plurality of ventilation fans designated inactive and having the greatest available lifetime, by turning off at least one of said plurality of ventilation fans which has been running longer than specified by its fan on-cycle specification data, to lengthen the life of the ventilation fan system.

2. The ventilation fan system of claim 1, wherein said plurality of ventilation fans and said fan array controller are operatively connected and communicate over a single parallel power supply bus.

3. The ventilation fan system of claim 1, wherein the static fan specification data further comprises mean-time-before-failure specification data and static fan off-cycle specification data, and wherein said fan array controller selects and turns on at least one of said plurality of ventilation fans designated as inactive based upon the fan's static fan off-cycle specification data and having the greatest available lifetime as computed from the static fan mean-time-between-failure specification data and dynamic fan time-in-use status data.

4. The ventilation fan system of claim 1, wherein the static fan specification data further comprises mean-time-before-failure specification data, and wherein said fan array controller selects and turns off at least one of said plurality of ventilation fans that is both active and has the least available lifetime as computed from the static fan mean-time-between-failure specification data and dynamic fan time-in-use status data.

5. The ventilation system of claim 1, further comprising sensor inputs from the external device adapted for the determination of the presence of at least one of heat from fire, smoke and hazardous gases in an environment, wherein said fan array controller responds to requests determined and made by the external device in accordance with said sensor inputs.

6. A ventilation fan system adapted for responding to an external device making requests for required changes in ventilation to lengthen the life of the system comprising:
   a plurality of ventilation fans, each ventilation fan comprising on-board computer readable memory for storing static fan on-cycle specification data, static fan off-cycle specification data and dynamic fan status data comprising at least fan time-in-use data; and
   a fan array controller operatively interconnected to said plurality of ventilation fans and the on-board computer readable memory, said fan array controller adapted for sending and receiving signals to and from each of said ventilation fans, said fan array controller being further adapted for receiving requests and sending status to and from the external device, wherein each said ventilation fan is adapted for selectively responding to control and fan time-in-use data requests received from said fan array controller, wherein said fan array controller meets ventilation demands while turning on at least one of said plurality of ventilation fans having the greatest available lifetime and turning off at least one of said plurality of ventilation fans having the least available lifetime, both the deploying and the turning off ventilation fans being determined by said fan array controller in accordance with the static fan specification data and dynamic fan time-in-use status data received from the on-board computer readable memory on each of said plurality of ventilation fans, wherein according to a recycle fan array routine said fan array controller selects and turns off a ventilation fan which has been running longer than specified by its fan on-cycle specification data, selects and turns on a fan having a greatest available lifetime, and selects and designates as inactive a fan which has been resting longer than specified by its static fan off-cycle specification data, to lengthen the life of the ventilation fan system.

7. The ventilation fan system of claim 6, wherein at least one of said ventilation fans is adapted for triggering a directed communication to said fan array controller upon the occurrence of a dynamic parameter outside of a predetermined range, and wherein the dynamic parameter comprises at least one of fan speed out of range, fan motor consuming excess current, excess fan temperature and fan failure.

8. The ventilation fan system of claim 6, wherein after a pre-determined period of time, the fan system reconfigures fan deployment to meet ventilation demands and lengthen the useful life of the ventilation fan system in accordance with the ventilation fan-provided static fan specification data and dynamic fan time-in-use status data.

9. The ventilation fan system of claim 6, wherein said fan array controller considers the ventilation fan-provided static fan specification data and dynamic fan time-in-use status data in determining deployment of a combination of fans to meet requirements with a plurality of fans having differing capabilities.

10. The ventilation fan system of claim 6, wherein the plurality of ventilation fans and said fan array controller are operatively connected and communicate over a single parallel power supply bus.

11. The ventilation fan system of claim 6, wherein the static fan specification data further comprises mean-time-before-failure specification data, and wherein said fan array controller selects and turns on at least one of said plurality of ventilation fans having the greatest available lifetime as computed from the static fan mean-time-between-failure specification data and dynamic fan time-in-use status data.

12. The ventilation fan system of claim 6, wherein the static fan specification data further comprises mean-time-before-failure specification data, and wherein said fan array controller selects and turns off at least one of said plurality of ventilation fans that is both active and has the least available lifetime as computed from the static fan mean-time-between-failure specification data and dynamic fan time-in-use status data.

13. An extended-life ventilation fan system adapted for providing ventilation to a target environment comprising:
   a ventilation control device;
   a plurality of ventilation fans, each ventilation fan comprising an on-board fan controller and computer readable memory for storing static fan specification data comprising at least static fan on-cycle specification data, static fan off-cycle specification data, static fan mean-time-between-failure specification data and dynamic fan status data comprising at least dynamic fan status time-in-use data; and
   a fan array controller, wherein said ventilation control device, said plurality of ventilation fans and said fan array controller are operatively interconnected to supply power to each of said plurality of ventilation fans and to communicate static mean-time-between-failure specification data and dynamic fan status time-in-use data both over a single multiplexed parallel power supply bus, said fan array controller adapted for turning on at least one of said plurality of ventilation fans having the greatest available lifetime, turning off at least one of said ventilation fans which has been running longer than specified by its fan on-cycle specification data, and selecting and designating as inactive at least one of said plurality of ventilation fans which has been resting longer than specified by its static fan off-cycle specification data to increase life of the system.

14. The extended-life ventilation fan system of claim 13, wherein said fan array controller computes remaining life of at least one of said plurality of ventilation fans using dynamic fan time-in-use data and static fan mean-time-between failure specification data, and selects for ventilation use and turns on one of said plurality of ventilation fans having the most remaining life as computed and controlled by said fan array controller.

15. The extended-life ventilation fan system of claim 13, wherein said fan array controller computes remaining lifetime of all currently active ventilation fans, selects a fan to subtract from ventilation use having the least available lifetime, signals the on-board fan controller of the ventilation fan selected to turn off its fan, adds the selected ventilation fan's current time-in-use to the selected ventilation fan's total time-in-use and writes the new total time-in-use into the on-board computer readable memory of the selected ventilation fan.

16. An extended-life ventilation fan system adapted for providing ventilation to a target environment comprising:
   a ventilation control device;
   a plurality of ventilation fans, each ventilation fan comprising an on-board fan controller and computer readable memory for storing static fan specification data comprising at least static fan on-cycle specification data, static fan off-cycle specification data and static fan mean-time-between-failure specification data and dynamic fan status data comprising at least dynamic fan time-in-use data;
   a fan array controller, wherein said ventilation control device, said plurality of ventilation fans and said fan array controller are operatively interconnected to supply power to each of said plurality of ventilation fans and to communicate static mean-time-between-failure specification data, static fan on-cycle specification data, static off-cycle specification data and dynamic fan status time-in-use data both over a single multiplexed parallel power supply bus, said fan array controller adapted for turning on and off each of said ventilation fans in accordance with commands received from said ventilation control device and in accordance with static mean-time-between-failure specification data and dynamic fan status time-in-use data for each fan so as to increase life of the system; and
   a recycle fan array routine, wherein according to said recycle fan array routine said fan array controller selects and turns off a ventilation fan which has been running longer than specified by its fan on-cycle specification data, selects and turns on a fan having a greatest available lifetime, and selects and designates as inactive a fan which has been resting longer than specified by its static fan off-cycle specification data.

17. The extended-life ventilation fan system of claim 16, wherein at least one of said ventilation fans is adapted for triggering a directed communication to said fan array controller to enter said recycle fan array routine upon the occurrence of a dynamic parameter outside of a predetermined range.

18. The extended-life ventilation fan system of claim 17, wherein the dynamic parameter comprises at least one of fan speed out of range, fan motor consuming excess current, fan excess operating temperature, and fan failure.

19. The extended-life ventilation fan system of claim 16, wherein said fan array controller is integrated on at least one of said ventilation fans.

20. The extended-life ventilation fan system of claim 16, wherein after a pre-determined period of time, the fan system reconfigures fan deployment to meet ventilation demands and lengthen the useful life of the ventilation fan system in accordance with the static fan mean-time-between-failure specification data and dynamic fan time-in-use status data.

21. The extended-life ventilation fan system of claim 16, wherein after receipt of new data by said fan array controller from the on-board fan controller of at least one of said plurality of ventilation fans, the fan system reconfigures fan deployment to meet ventilation demands and lengthen the useful life of the ventilation fan system.

22. The extended-life ventilation fan system of claim 16, wherein at least one of said plurality of fans has differing capabilities than another of said plurality of fans and wherein said fan array controller considers the static fan mean-time-between-failure specification data and dynamic fan time-inuse status data from each of said plurality of fans in determining deployment of a combination of fans to ventilate the target environment.

23. The extended-life ventilation fan system of claim 16, wherein said fan array controller is capable of automatically removing a failed one of said plurality of ventilation fans from deployment and replacing said failed one of said plurality of ventilation fans with another of said plurality of ventilation fans based upon dynamic data provided to said fan array controller by said failed one of said plurality of ventilation fans.

24. The extended-life ventilation system of claim 16,
further comprising sensor inputs from said ventilation control device being adapted for the determination of the presence of at least one of heat from fire, smoke and hazardous gases in an environment, wherein said fan array controller responds to requests determined and made by said ventilation control device in accordance with said sensor inputs.

* * * * *